(12) United States Patent
Chang et al.

(10) Patent No.: US 11,006,382 B2
(45) Date of Patent: May 11, 2021

(54) ELECTRONIC APPARATUS AND METHOD FOR CONTROLLING THEREOF

(71) Applicant: SAMSUNG ELECTRONICS CO., LTD., Suwon-si (KR)

(72) Inventors: Gihun Chang, Suwon-si (KR); Jinhan Kim, Suwon-si (KR); Kihyuck Shin, Suwon-si (KR); Chuljoo Kim, Suwon-si (KR); Hyungrok Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/793,007

(22) Filed: Feb. 18, 2020

(65) Prior Publication Data

US 2020/0305107 A1  Sep. 24, 2020

(30) Foreign Application Priority Data

Mar. 22, 2019 (KR) ........................ 10-2019-0033080

(51) Int. Cl.
*H04W 60/06* (2009.01)
*H04W 76/14* (2018.01)
*H04W 60/00* (2009.01)

(52) U.S. Cl.
CPC ......... *H04W 60/06* (2013.01); *H04W 60/005* (2013.01); *H04W 76/14* (2018.02)

(58) Field of Classification Search
CPC ..... H04W 4/029; H04W 60/00; H04W 80/04; H04W 4/50; H04W 92/02; H04W 60/06; H04W 8/02; H04W 12/06; H04W 64/003; H04W 4/025; H04W 4/06; H04W 80/10; H04W 8/10; H04W 76/19; H04W 8/12; H04W 4/023; H04W 4/203; H04W 4/90; H04W 76/50; H04W 16/14; H04W 8/06; H04W 76/14; H04W 60/005;
(Continued)

(56) References Cited

U.S. PATENT DOCUMENTS 9,019,944 B2  4/2015  Swaminathan
9,449,278 B2  9/2016  Davlos et al.
(Continued)

FOREIGN PATENT DOCUMENTS

EP  3 046 033 A1  7/2016
JP  5712991 B2  5/2015
(Continued)

OTHER PUBLICATIONS

International Search Report dated May 22, 2020 issued by the International Searching Authority in counterpart International Application No. PCT/KR2020/001966 (PCT/ISA/210).
(Continued)

*Primary Examiner* — Fred A Casca
(74) *Attorney, Agent, or Firm* — Sughrue Mion, PLLC

(57) ABSTRACT

An electronic apparatus and a method for controlling the electronic apparatus including the steps of, based on failure of registration of a controllable electronic apparatus to a network, acquiring log information of the electronic apparatus, the controllable electronic apparatus and a network apparatus, identifying corresponding log information among the acquired log information, harmonizing the corresponding log information based on time, identifying an error by using log information, and providing a solution corresponding to the error.

19 Claims, 21 Drawing Sheets

(58) Field of Classification Search
CPC ... H04W 24/10; H04W 48/18; H04W 84/042; H04W 8/04; H04W 48/20; H04W 4/70; H04W 12/004; H04W 12/0609; H04L 65/1073; H04L 65/1016; H04L 67/24; H04L 67/04; H04L 67/30; H04L 51/38; H04L 65/1006; H04L 61/15; H04L 41/0803; H04L 43/50; G06F 11/30; H04M 1/2478; H04M 1/2535; Y02D 10/153; Y02D 70/1242

See application file for complete search history.

(56) References Cited

U.S. PATENT DOCUMENTS

| | | |
|---|---|---|
| 9,477,573 B2 | 10/2016 | Page et al. |
| 9,671,778 B2 | 6/2017 | Yamamoto et al. |
| 2007/0143121 A1 | 6/2007 | Hartman et al. |
| 2008/0183862 A1 | 7/2008 | Kobayashi |
| 2009/0094484 A1 | 4/2009 | Son et al. |
| 2009/0150455 A1 | 6/2009 | Kanda et al. |
| 2014/0089354 A1 | 3/2014 | Gonsalves et al. |

FOREIGN PATENT DOCUMENTS

| | | |
|---|---|---|
| JP | 2017-123521 A | 7/2017 |
| KR | 10-0863126 B1 | 10/2008 |
| KR | 10-0898339 B1 | 5/2009 |

OTHER PUBLICATIONS

International Written Opinion dated May 22, 2020 issued by the International Searching Authority in counterpart International Application No. PCT/KR2020/001966 (PCT/ISA/237).

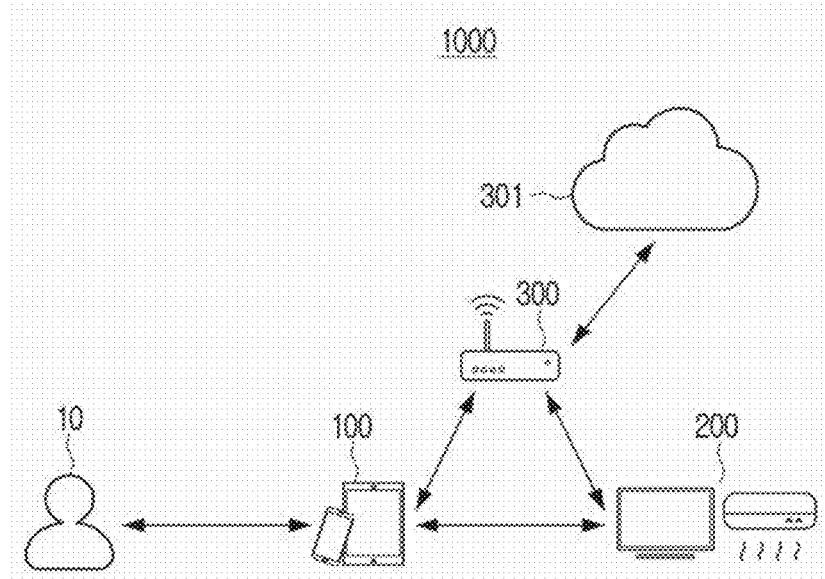

LOG OF CONNECTION ENVIRONMENT (ENV)

...
2018-09-03 21:58:38.036 POST /oic/account 201
2018-09-03 21:58:38.036 SIGN_UP /oic/account SUCCESS
...
2018-09-03 21:58:39.060 SEND_OBSERVE_NOTIFICATION
...

STARTING POINT OF D2S TRANSACTION
LOG OF ELECTRONIC APPARATUS 09-03 21:39:18.03 V/Wifi ConfigManager( 1387): Adding/Updating network [air purifier] Samsung
09-03 21:39:18.813 D/SupplicantStateTracker( 1387): connectToNetwork "[air purifier] Samsung"WPA_PSK

LOG OF ELECTRONIC APPARATUS
LOG OF REGISTRATION APPARATUS

...
21:57:04.106 [easysetup] | OCF ocf_manager.c:210 Easysetup Start Success
21:39:18.262 WiFi Wifi_manager.c:89 WiFi Status Changes [CLIENT_DISCONNECTED] → [CLIENT_CONNECTED]
21:58:19.209 WiFi Wifi_manager.c:101 SOFT AP MODE - CONNECTED FROM CLIENT
21:58:33.910 REQUEST | POST | 206 B | /oic/account
21:58:34.735 RESPONSE | CHANGED | 1182 B | (null)
...

520

+4.781s 0.000s

+0.656s

530

→ 21:58:34.279 SEND_OBSERVE_NOTIFICATION

21:59:18.183 Adding/Updating network [air purifier] Samsung // COMPLETION OF SEARCH OF REGISTRATION APPARATUS

STEP OF APPARATUS SEARCH: NORMAL

21:57:03.460 Easysetup Start // START OF A SOFT AP MODE OF THE REGISTRATION APPARATUS // A RESPONSE CORRESPONDING TO THE SEND_NOTIFICATION IS NOT IDENTIFIED WITHIN THE TIME OF 21:58:34.279.

KEYLOG : ENV : SEND_OBSERVE_NOTIFICATION
         ENROLLEE : Timeout  — 540

FIG. 14B

APPARATUS INFORMATION

| | |
|---|---|
| MODEL | SM-G950F |
| KERNEL VERSION | 4.4.111-14023573-QB19026410 |
| OS VERSION | 8.0.0 |
| SMART THINGS | 1.7.16-25 |
| NUMBER OF SECURITY PROGRAMS | 5 |

SECURITY PROGRAM

DIAGNOSIS

CURRENT ENVIRONMENT IS BAD
AS A RESULT OF DIAGNOSIS, A PROBLEM WAS FOUND IN ONE ITEM AMONG EIGHT ITEMS IN TOTAL.

SUMMARY:
SOFT AP [WASHER] SAMSUNG IS ALREADY STORED IN THE MOBILE PHONE.

PLEASE LOG ON TO A SAMSUNG ACCOUNT FOR PERFORMING CLOUD DIAGNOSIS.

ADDITIONAL INFORMATION    INITIALIZATION RESULT

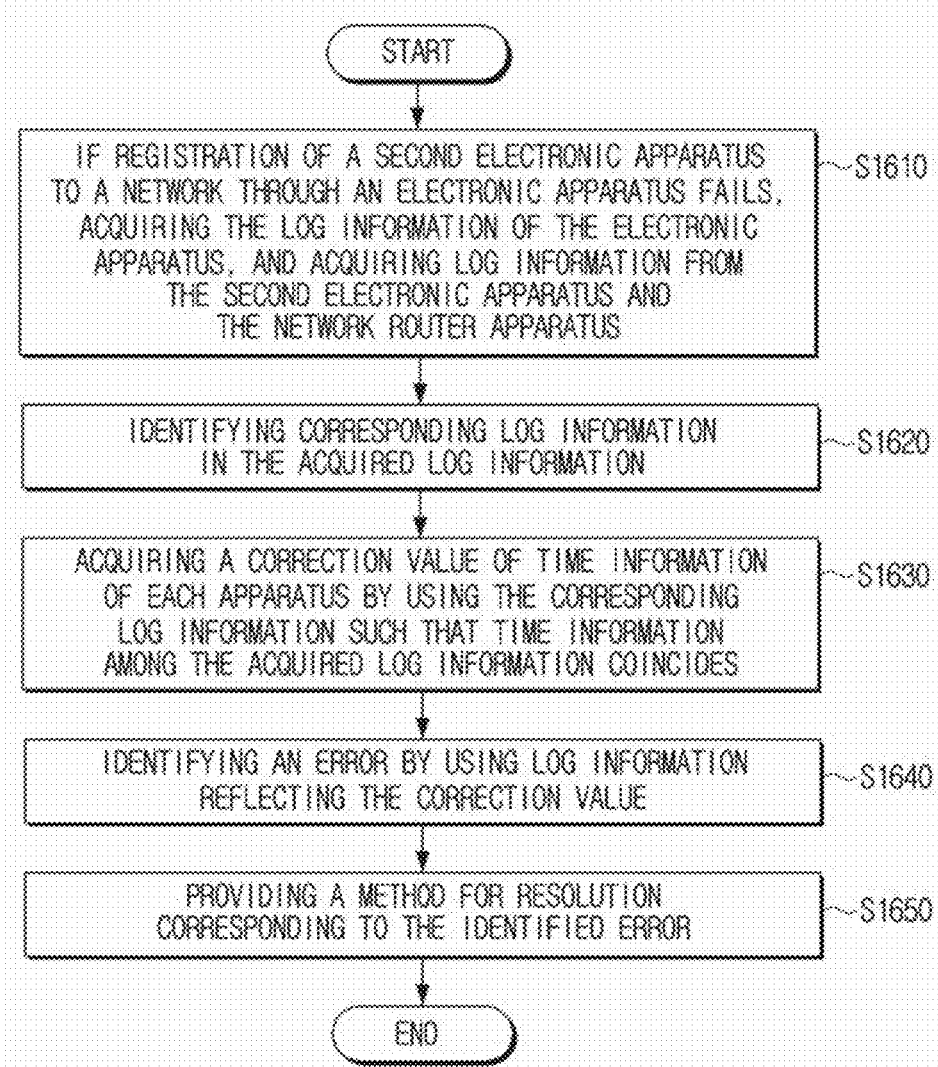

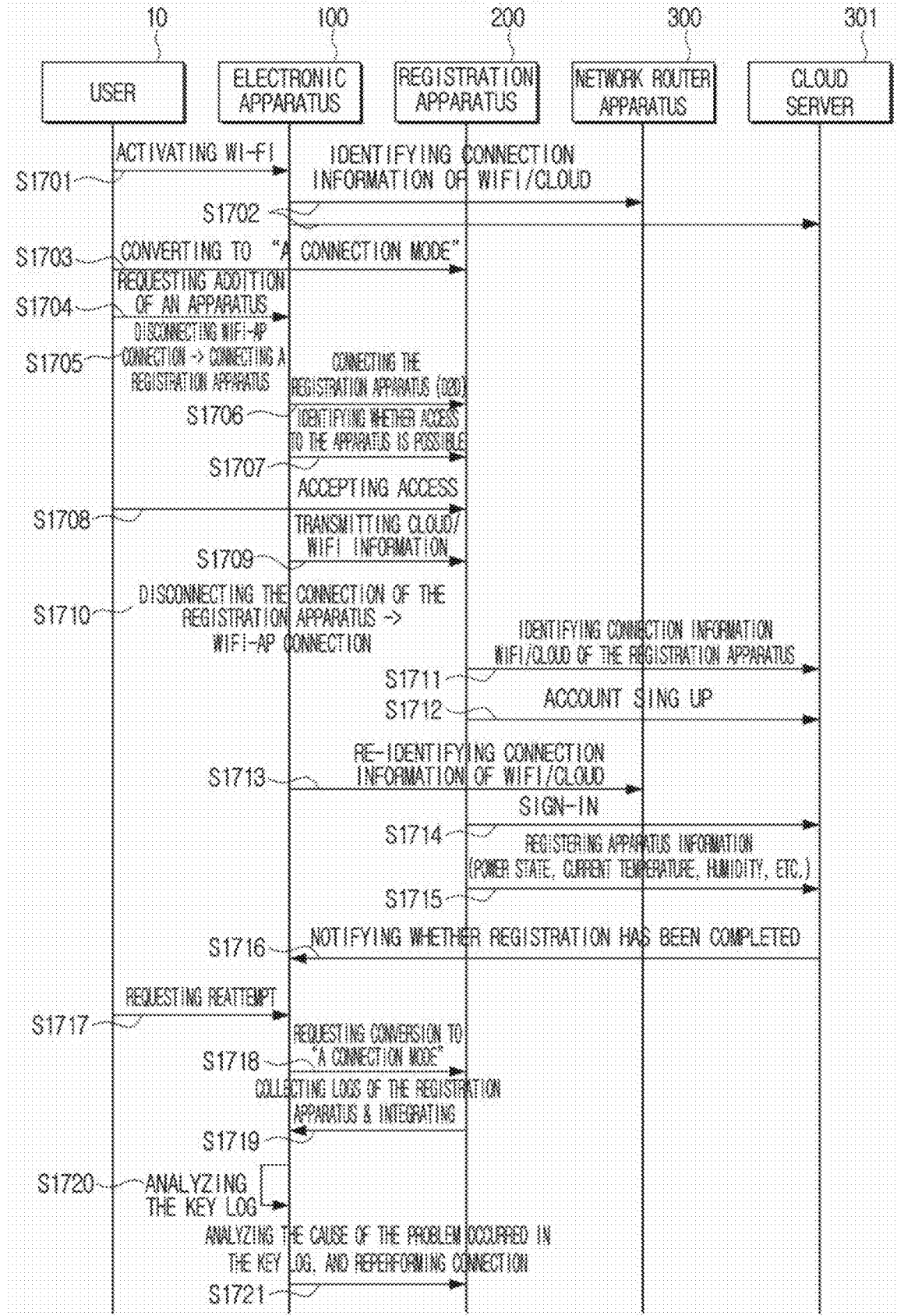

ELECTRONIC APPARATUS AND METHOD FOR CONTROLLING THEREOF

CROSS-REFERENCE TO RELATED APPLICATION(S)

This application is based on and claims priority under 35 U.S.C. § 119(a) of a Korean Patent Application No. 10-2019-0033080, filed on Mar. 22, 2019, in the Korean Intellectual Property Office, the disclosure of incorporated by reference herein in its entirety.

BACKGROUND

1. Field

The disclosure relates to an electronic apparatus and a method of controlling the apparatus. More particularly, the disclosure relates to an electronic apparatus for resolving an error that occurs when initially registering another electronic apparatus to a network in an Internet of Things (IoT) environment and a method for controlling the apparatus.

2. Description of Related Art

With the recent development of semiconductor technologies and wireless communication technologies, a communication network may be formed between various objects. Accordingly, objects connected to the network can be conveniently controlled. Commonly, controllable or customizable electronics devices connected through networks may be referred to as Internet of Things (IoT) devices.

However, there may exist a problem with respect to connections of IoT devices to networks that, when an electronic apparatus is initially registered to a network, registration of the electronic apparatus may fail and a cause for the error may be difficult to determine.

In determining the cause of the electronic apparatus failing to register with a communication network, log information of an electronic apparatus or network equipment may be reviewed. For example, in the case of attempting to register a controlled or a controllable device (e.g., a smart device) using a controller device (e.g., a smartphone) to a network controlled by a control point (e.g., a home gateway, router, etc.), the logs of the controller device, the controlled device, and/or the gateway may be reviewed to determine a cause of failing to register the controlled device with the network. However, such logs are dispersed amongst the differing devices, and accordingly it may be inconvenient and difficult for a user to quickly and accurately determine a precise cause of the registration error.

SUMMARY

A method for controlling an electronic apparatus according to an embodiment of the disclosure includes the steps of, based on a failure of a registration of a controllable electronic apparatus to a network, acquiring first log information of the electronic apparatus, second log information of the controllable electronic apparatus, and third log information of an access point that controls the registration of the controllable electronic apparatus by the electronic apparatus to the network, identifying a log information including information on the same transaction among the first log information, the second log information, and the third log information, adjusting at least one of the first log information, the second log information, and the third log information so that time information of the first log information, the second log information, and the third log information coincide, by using the identified log information, identifying an error occurring during the registration of the controllable electronic apparatus based on the first log information, the second log information, and the third log information, and providing a solution for the registration of the controllable electronic apparatus corresponding to the error.

An electronic apparatus according to an embodiment of the disclosure includes a communicator, a memory storing at least one instruction, and a processor which when executing the at least one instruction is configured to based on a failure of a registration of a controllable electronic apparatus to a network, acquire first log information of the electronic apparatus, second log information of the controllable electronic apparatus, and third log information of an access point that controls the registration of the controllable electronic apparatus by the electronic apparatus to the network, identify a log information including information on the same transaction from among the first log information, the second log information, and the third log information, adjust at least one of the first log information, the second log information, and the third log information so that time information of the first log information, the second log information, and the third log information coincide, by using the identified log information, identify an error occurring during the registration of the controllable electronic apparatus based on the first log information, the second log information, and the third log information, and provide a solution for the registration of the controllable electronic apparatus corresponding to the error.

Meanwhile, in a computer-readable recording medium including a program for executing a method for controlling an electronic apparatus according to an embodiment of the disclosure, the method for controlling an electronic apparatus may include the steps of, based on a failure of a registration of a controllable electronic apparatus to a network, acquiring first log information of the electronic apparatus, second log information of the controllable electronic apparatus, and third log information of an access point that controls the registration of the controllable electronic apparatus by the electronic apparatus to the network, identifying a log information including information on the same transaction from among the first log information, the second log information, and the third log information, adjusting at least one of the first log information, the second log information, and the third log information so that time information of the first log information, the second log information, and the third log information coincide, by using the identified log information, identifying an error occurring during the registration of the controllable electronic apparatus based on the first log information, the second log information, and the third log information, and providing a solution for the registration of the controllable electronic apparatus corresponding to the error.

BRIEF DESCRIPTION OF THE DRAWINGS

FIG. 1A is a diagram illustrating a network system according to an embodiment of the disclosure;

FIG. 6 is a diagram illustrating an operation of analyzing the cause of an error using log information;

FIG. 14B is a diagram illustrating an embodiment of a UI screen displayed on an electronic apparatus in case the cause of an error in registration of a registration apparatus is the pre-storing of a soft AP;

FIG. 16 is a flow chart illustrating a method of controlling an electronic apparatus according to an embodiment of the disclosure; and FIG. 17 is a sequence diagram illustrating a method of analyzing an error in registration of a network system according to an embodiment of the disclosure.

DETAILED DESCRIPTION

Figure 1B:
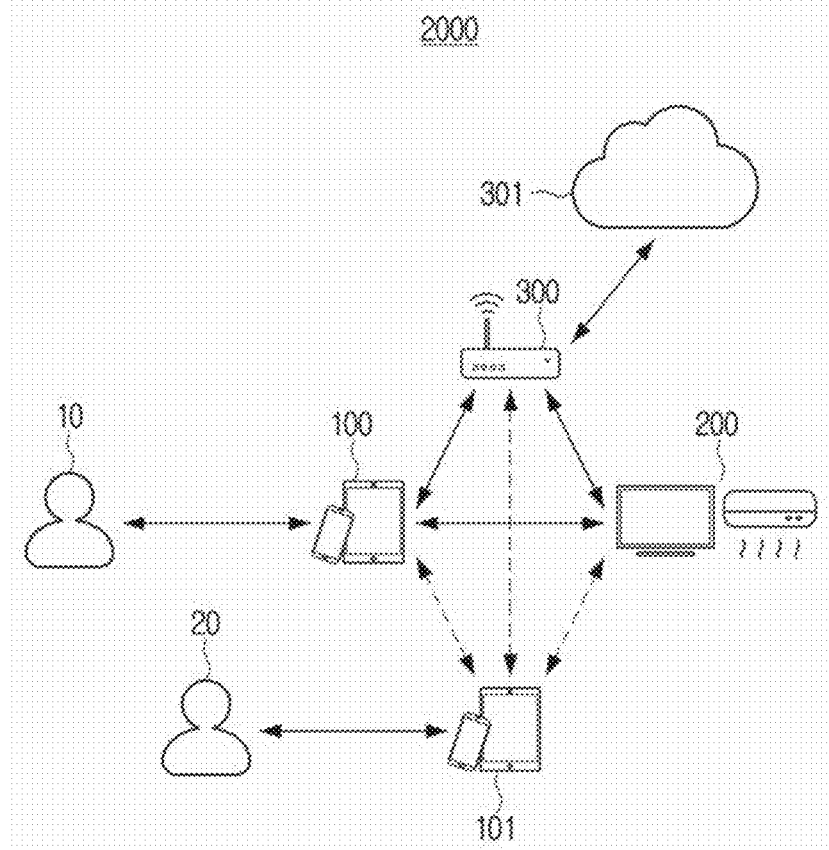
FIG. 1B is a diagram illustrating a network system according to an embodiment of the disclosure.

The disclosure was devised for addressing the aforementioned background, and the purpose of the disclosure is in providing an electronic apparatus capable of analyzing log information of an error that occurs when initially registering another electronic apparatus to a network by using an electronic apparatus in an IoT environment and resolving the error, and a method of controlling thereof.

In general, terms used in the disclosure will be described, and then the disclosure will be described in detail.

As terms used in the embodiments of the disclosure, general terms that are currently used widely were selected as far as possible, in consideration of the functions described in the disclosure. However, the terms may vary depending on the intention of those skilled in the art who work in the pertinent field or emergence of new technologies. Also, in particular cases, there may be other terms that have been selected, and in such cases the meaning of the selected terms will be described in detail in the relevant descriptions in the disclosure. Thus, the terms used in the disclosure should be defined based on the meaning of the terms and the overall content of the disclosure, but not just based on the names of the terms.

Further, various modifications may be made to the embodiments of the disclosure, and there may be various types of embodiments. Accordingly, specific embodiments will be illustrated in drawings, and the embodiments will be described in detail in the detailed description. However, it should be noted that the various embodiments are not for limiting the scope of the disclosure to a specific embodiment, but the embodiments should be interpreted to include all modifications, equivalents or alternatives of the embodiments included in the ideas and the technical scopes disclosed herein. In describing the embodiments, detailed explanation of related known technologies may unnecessarily confuse the gist of the disclosure, and such detailed and unnecessary explanation will be omitted for sake of clarity.

In addition, terms such as "first," "second," and the like may be used to describe various elements, but the terms are not intended to limit the elements. Such terms are used only to distinguish one element from another element.

Meanwhile, singular expressions also include plural expressions as long as an alternative meaning is clear from the context of the disclosure. In addition, in the disclosure, terms such as "include" and "consist of" should be construed as designating that there are such characteristics, numbers, steps, operations, elements, components or a combination thereof described in the specification, but not to exclude in advance the existence or possibility of adding one or more of other characteristics, numbers, steps, operations, elements, components or a combination thereof.

Also, in the embodiments of the disclosure, 'a module' or 'a part' may perform at least one function or operation, and may be implemented as hardware or software, or as a combination of hardware and software. Further, a plurality of 'modules' or 'parts' may be integrated into at least one module and implemented as at least one processor, excluding 'a module' or 'a part' that needs to be implemented as specific hardware.

Hereinafter, the embodiments of the disclosure will be described in detail with reference to the accompanying drawings, such that those having ordinary skill in the art to which the disclosure belongs can easily carry out and implement the concepts of the disclosure. However, it should be noted that the disclosure may be implemented in various different forms, and is not limited to the embodiments described herein. Also, in the drawings, parts that are not related to explanation were omitted, for explaining the disclosure clearly, and throughout the specification, similar components were designated by similar reference numerals.

Hereinafter, the disclosure will be described in more detail with reference to the accompanying drawings.

FIGS. 1A and 1B are diagrams illustrating a network system according to an embodiment of the disclosure.

Referring to FIG. 1A, a network system 1000 according to an embodiment of the disclosure includes an electronic apparatus 100, a registration apparatus 200, a network router apparatus 300, and a cloud server 301.

A user 10 may control the electronic apparatus 100 and the registration apparatus 200 in an IoT environment connected through a network 300, 301. For example, the electronic apparatus 100 and the registration apparatus 200 may be implemented as a smartphone, a desktop PC, a laptop PC, a netbook computer, a server, a PDA, a PMP, a medical device, a camera, a TV, a refrigerator, an air conditioner, a cleaner, an oven, a washing machine, an air purifier, an artificial intelligence speaker, a set-top box, a home automation control panel, a security control panel, a media box (e.g.: Samsung HomeSync™, Apple TV™, or Google TV™), a game console (e.g.: Xbox™, PlayStation™), a kiosk, and a wearable device (a watch, a ring, a bracelet, an ankle bracelet, a necklace, glasses, a contact lens, or a head-mounted-device (HMD), clothing, a skin pad), etc.

In particular, the electronic apparatus 100 may receive input of an instruction regarding the network system 1000 from a user 10, and provide information on the network system 1000.

Also, the registration apparatus 200 is at least one electronic apparatus distinguished from the electronic apparatus 100, and means an electronic apparatus to be registered to the cloud server 301, and may be registered to the cloud server 301 through the electronic apparatus 100. Here, the electronic apparatus 100 may be a relaying apparatus for registering the registration apparatus 200 to the cloud server 301.

Meanwhile, the registration apparatus 200 may also be referred to as a second electronic apparatus distinguished from the electronic apparatus 100, but hereinafter, the registration apparatus 200 will be referred to as the registration apparatus 200 for the convenience of explanation.

Meanwhile, the electronic apparatus 100 and the registration apparatus 200 may transmit data to and receive data from the cloud server 301 through the network router apparatus 300.

The disclosure describes a method for analyzing the cause of an error and resolving the error by the electronic apparatus 100 in a scenario that initial registration of the registration apparatus 200 to the cloud server 301 through the electronic apparatus 100 fails. Specifically, the electronic apparatus 100 may aggregate and analyze log information of the electronic apparatus 100, the registration apparatus 200, the network router apparatus 300, and the cloud server 301 to acquire the cause of an error. The electronic apparatus 100 may obtain a solution corresponding to the cause of the error based on the analyzed log information. The detailed operation of the electronic apparatus 100 will be described in detail below with reference to FIGS. 2 to 17.

FIG. 1B illustrates a network system 2000 according to an embodiment of the disclosure.

Referring to FIG. 1B, the network system 2000 includes an electronic apparatus 100, a registration apparatus 200, a network router apparatus 300, a cloud server 301, and a diagnosis apparatus 101 of a service engineer 20. As the electronic apparatus 100, the registration apparatus 200, the network router apparatus 300, and the cloud server 301 in FIG. 1B are the same as the components illustrated in FIG. 1A, redundant explanation will be omitted.

FIG. 1B describes an embodiment in which a user 10 could not solve an error. Instead, a service engineer 20 and the diagnosis apparatus 101 of the service engineer 20 may perform the same operation as the operation of the electronic apparatus 100.

Specifically, the diagnosis apparatus 101 may receive input of an instruction regarding the network system 2000 from the service engineer 20, and provide information on the network system 2000.

The diagnosis apparatus 101 of the service engineer 20 may be connected with the electronic apparatus 100, the registration apparatus 200, and the network router apparatus 300 of the user 10 and receive log information of each apparatus. Here, log information received from the network router apparatus 300 may include log information of the network router apparatus 300 and log information of the cloud server 301 connected with the network router apparatus 300.

In particular, in case registration of the registration apparatus 200 to the cloud server 301 fails, the diagnosis apparatus 101 of the service engineer 20 may acquire log information from the electronic apparatus 100, the registration apparatus 200, and the network router apparatus 300. Then, the diagnosis apparatus 101 may analyze the acquired log information and identify the cause of an error, and provide a solution corresponding to the identified cause of the error to the service engineer 20.

Figure 2:
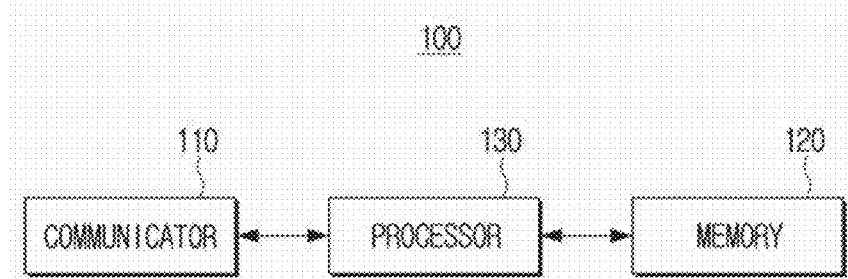
FIG. 2 is a block diagram illustrating a schematic configuration of an electronic apparatus according to an embodiment of the disclosure.

FIG. 2 is a block diagram illustrating a schematic configuration of an electronic apparatus according to an embodiment of the disclosure.

Referring to FIG. 2, the electronic apparatus 100 includes a communicator 110, a memory 120, and a processor 130.

The communicator 110 is a component performing communication with various types of external apparatuses according to various types of communication methods. The communicator may include a communication circuit for wired or wireless communication installed on the electronic apparatus 100. Here, an external apparatus communicating with the electronic apparatus 100 may be a network router apparatus, an electronic apparatus to be registered to a network, etc. Depending on embodiments, the electronic apparatus 100 may communicate with an external server, or another user terminal apparatus.

Connection of communication between the communicator 110 and an external apparatus via the communicator 110 may include communication through a third apparatus (e.g., a repeater, a hub, an access point, a server, or a gateway, etc.). Wireless communication may include, for example, cellular communication using at least one of LTE, LTE Advance (LTE-A), code division multiple access (CDMA), wideband CDMA (WCDMA), a universal mobile telecommunications system (UMTS), Wireless Broadband (WiBro), or a Global System for Mobile Communications (GSM). According to an embodiment of the disclosure, wireless communication may include, for example, at least one of wireless fidelity (WiFi), Bluetooth, Bluetooth low energy (BLE), Zigbee, near field communication (NFC), Magnetic Secure Transmission, radio frequency (RF), or a body area network (BAN). Wired communication may include, for example, at least one of a universal serial bus (USB), a high definition multimedia interface (HDMI), a recommended standard232 (RS-232), power line communication, or a plain old telephone service (POTS). Networks in which wireless communication or wired communication is performed may include at least one of a telecommunication network, for example, a computer network (e.g.: an LAN or a WAN), the Internet, or a telephone network.

The processor 130 may store log information acquired by transmitting data to and receiving data from an external apparatus through the communicator 110 in the memory 120.

Here, the memory 120 may store various kinds of programs and data necessary for the operation of the electronic apparatus 100. Specifically, in the memory 120, at least one instruction may be stored. The processor 130 may perform the aforementioned operation by executing the instructions stored in the memory 120. The memory 120 may be implemented as a non-volatile memory, a volatile memory, a flash-memory, a hard disk drive (HDD), or a solid state drive (SSD), etc. The memory 120 may be accessed by the processor 130, and reading/recording/correction/deletion/update, etc. of data by the processor 130 may be performed. In the disclosure, the term memory may include the memory 120, a ROM inside the processor 130, a RAM, or a memory card mounted on the electronic apparatus 100 (e.g., a micro SD card, a memory stick). Also, in the memory 120, programs and data for constituting various kinds of screens to be displayed in the display area of the display may be stored.

In addition, in the memory 120, a database may store information regarding a solution for the cause of an error in registration of the registration apparatus. Depending on embodiments, the solution database may be stored in an external server or the memory 120.

The processor 130 may be electronically connected with the memory 120 and control the overall operations of the electronic apparatus 100. Specifically, the processor 130 may control the electronic apparatus 100 by executing at least one instruction stored in the memory 120.

According to an embodiment of the disclosure, the processor 130 may be implemented as a digital signal processor (DSP), a microprocessor, and a time controller (TCON). However, the processor 130 is not limited thereto, and the processor 130 may include one or more of a central processing unit (CPU), a micro controller unit (MCU), a micro processing unit (MPU), a controller, an application processor (AP) or a communication processor (CP), and an ARM processor, or may be defined by the terms. Also, the processor 130 may be implemented as a system on chip (SoC) having a processing algorithm stored therein or large scale integration (LSI), or in the form of a field programmable gate array (FPGA).

If registration to a network by the registration apparatus through the electronic apparatus 100 fails, the processor 130 may acquire log information of the electronic apparatus 100, and acquire log information from the registration apparatus and the network router apparatus.

For example, log information of the electronic apparatus 100 may include the model information of the electronic apparatus 100, the manufacture's serial number, the OS version, the kernel, the build number, the S/T app version, whether security software (SW) is installed, the S/T app setting (cloud control), the log information of the operation of the electronic apparatus 100, etc.

Meanwhile, log information of the registration apparatus received from the registration apparatus may include the firmware version of the registration apparatus, the RSSI of the AP measured at the registration apparatus, information on a usage bandwidth/channel (e.g., in case the registration apparatus is a TV, 5 GHz), log information of the operation of the registration apparatus, etc.

Meanwhile, log information for a connection environment received from the network router apparatus may include information on access point compatibility, network state information, and state information of the cloud service. Specifically, log information for a connection environment received from the network router apparatus may include log information generated at the network router apparatus itself and log information of the cloud server acquired at the cloud server. That is, the electronic apparatus 100 may receive log information acquired at the cloud server through the network router apparatus.

Specifically, information on access point compatibility may include the AP vendor, the S/T, whether a port is blocked, whether UPnP is supported, the signal strength (RSSI), the channel, the bandwidth (2.4 GHz, 5 GHz), etc. Also, network state information may include whether the S/T cloud DNS succeeded, the cloud connection speed (Mbps), etc. In addition, state information of the cloud service may include the log of Samsung account sign-in, the log of the operation of the SmartThing cloud, the log of the plugin download operation, etc.

In this case, log information of each apparatus may include log information for transactions performed between each apparatus.

Here, a transaction may mean the unit of communication performed between apparatuses through the network. Also, a transaction may mean log information respectively recorded in the two apparatuses regarding the data transmission operation (transmission, reception) performed between the two apparatuses that requested and received a transaction.

Also, here, log information acquired at each apparatus may include information on a transaction and information on the time when the transaction is performed. Here, information on a transaction may mean information on the content of a transaction performed at the two apparatuses. For example, referring to information on a transaction, it may be identified through log information whether a device-to-device (D2D) connection between the electronic apparatus 100 and the registration apparatus was completed.

Meanwhile, the processor 130 may acquire log information of an external electronic apparatus in a state that the electronic apparatus 100 and the external electronic apparatus are device-to-device (D2D) connected. For example, the electronic apparatus 100 may first perform D2D connection with the registration apparatus to be registered to the network, and then acquire log information of the registration apparatus from the D2D connected registration apparatus.

Further, the processor 130 may identify corresponding log information in the acquired log information of the electronic apparatus 100 and the log information of the external apparatus. Here, corresponding log information may mean log information for the same transaction performed between the two apparatuses in the log information respectively recorded in the two apparatuses. In this case, information on the corresponding transaction for one transaction performed at the two apparatuses may be information matched in advance and stored in the memory 120 in advance. In accordance thereto, the processor 130 may analyze information on the transaction included in the log information of each apparatus and identify corresponding log information of the two apparatuses in which the same transaction was performed.

Then, the processor 130 may acquire a correction value of time information for each apparatus by using the corresponding log information identified in the log information of each apparatus such that time information between the log information of each apparatus coincides.

Here, the processor 130 may identify log information for a transaction performed between the electronic apparatus 100 and at least another apparatus among a plurality of external apparatuses, but the processor 130 may also identify log information for transactions performed among a plurality of external apparatuses.

Specifically, the identified log information may include log information for a request of a transaction acquired from one apparatus among the electronic apparatus 100, the network router, and the registration apparatus and log information for a response corresponding to a request acquired from an apparatus different from the apparatus that requested a transaction.

Here, if there is no log information for the response within a predetermined time period from a time when log information for the request of a transaction was generated, the processor 130 may identify the error as an error of a connection operation related to the transaction. In this case, by the transaction performed before the request, time information between apparatuses may have been corrected.

For example, the processor 130 may acquire information on the time when log information for a request for registration that the registration apparatus transmitted to the network router was generated in the log information of the registration apparatus, and if there is no log information for a response corresponding to the request for registration within a predetermined time period from the acquired time information in the log information of the network router, the processor 130 may identify that there is the cause of the error in the network environment.

Meanwhile, in case multiple transactions are performed between apparatuses, the processor 130 may identify log information for the initial same transaction among a plurality of transactions as corresponding log information. Then, based on the log information of the electronic apparatus 100, the received log information of the network router, and the log information of at least one registration apparatus, the processor 130 may acquire a correction value of time information for each apparatus based on time information of log information for the transaction initially performed between apparatuses. An operation of correcting time information for each apparatus by using corresponding log information will be described in detail below with reference to FIGS. 5 and 6.

Then, the processor 130 may identify an error by using log information reflecting the correction value. Specifically, the processor 130 may identify an error related to at least one of the electronic apparatus and the plurality of external apparatuses based on log information reflecting the correction value.

Also, the processor 130 may provide a solution corresponding to the identified error. Specifically, the processor 130 may acquire information on a solution corresponding to the identified error in a solution database stored in the memory 120.

Figure 3:
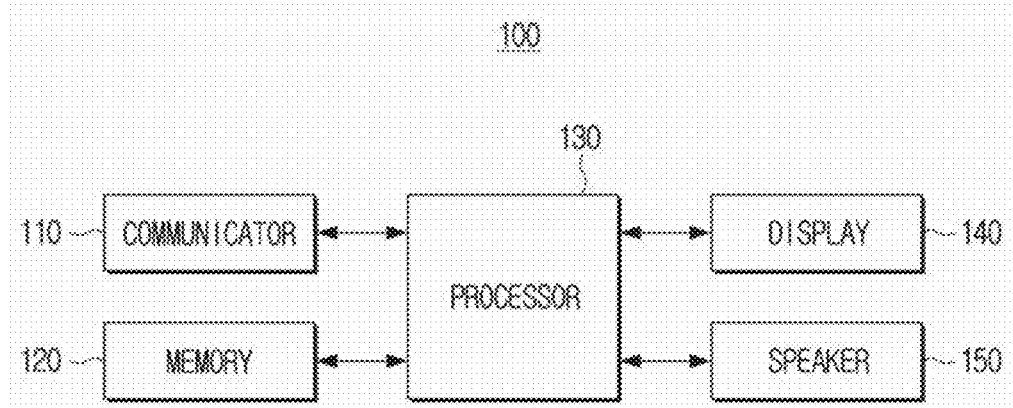
FIG. 3 is a block diagram illustrating a detailed configuration of the electronic apparatus illustrated in FIG. 2.

Further, the processor 130 may display the acquired solution information on the display (140 in FIG. 3). Here, in the solution information, the cause or solution of the error may be included. By virtue of the solution, the user may resolve the error based on the solution information displayed on the display.

Meanwhile, the processor 130 may acquire a control command regarding an external apparatus related to the error based on the acquired solution information. Then, the processor 130 may transmit the acquired control command to the external apparatus related to the error.

For example, if the identified error is related to the registration apparatus, the processor 130 may acquire a control command of the registration apparatus related to the error, and transmit the acquired control command to the registration apparatus. As an example, in case the cause of an error of registering the registration apparatus to the network is that the registration apparatus is not changed to a soft access point (AP) mode, the processor 130 may generate a control command for converting the registration apparatus to a soft AP mode, and transmit the generated control command to the registration apparatus.

A soft AP is an acronym of a software enabled access point having the function of an access point, and may mean software that enables an apparatus that is not a router to operate as a wireless AP. For example, a tethering function by which an electronic apparatus is used as an access point and a registration apparatus such as a laptop computer, a camera, a washing machine, and an air conditioner is connected to the electronic apparatus, and can use wireless Internet is a function using a soft AP technology.

Here, in order that the registration apparatus can use a wireless network, the soft AP mode should be activated so that the registration apparatus becomes an access point. That is, in order that the registration apparatus can be registered to a cloud through a wireless network, the registration apparatus should be changed to the soft AP mode.

As described above, the electronic apparatus 100 may perform another operation for resolving an error according to the identified error based on log information.

Meanwhile, in addition to the aforementioned cause of an error, a connection error that may occur between the electronic apparatus 100 and the registration apparatus may be determined. As an example, in case the registration apparatus broadcasts state information or log information to a plurality of electronic apparatuses in the vicinity, the electronic apparatus 100 may acquire information on the state of the registration apparatus. For example, in case the registration apparatus outputs its own state information as a beep sound, etc., the electronic apparatus 100 that received the beep sound may acquire the state of the registration apparatus, and may determine a connection error between the registration apparatus based thereon.

The content described below is an example of a connection error that may occur between the electronic apparatus 100 and the registration apparatus and a solution thereof In case a wireless (Wi-Fi, BT, BLE) signal between the electronic apparatus 100 and the registration apparatus is weak, and thus the apparatuses cannot be connected, the electronic apparatus 100 may provide a solution guide to the user.

In case there are a plurality of registration apparatuses around the electronic apparatus 100, and thus D2D connection among the apparatuses is impossible, the electronic apparatus 100 may provide a solution guide requesting to remove the adjacent registration apparatuses to the user.

In case connection to a network or a registration apparatus is impossible due to an error in the setting of the electronic apparatus 100, the electronic apparatus 100 may resolve the error by generating a control command changing the setting.

When the electronic apparatus 100 is connected to a registration apparatus, if approval related to connection (e.g.: an operation of physically pressing a button, etc.) from a user is needed at the registration apparatus, but the user could not properly perform the approval, the electronic apparatus 100 may resolve the error by generating a control command for receiving approval, and transmitting the generated control command to the registration apparatus.

When the electronic apparatus 100 is connected to a registration apparatus, if approval related to connection from a user was not performed properly at the registration apparatus and failed, the registration apparatus may resolve the connection error by automatically approving the approval in the next connection.

Meanwhile, an error that may occur between the electronic apparatus 100 and the network and a solution thereof may be as follows.

In case a cloud (a service provider) connected to the network router apparatus could not acquire authority necessary for registration/control from the cloud due to an obstacle or congestion, the electronic apparatus 100 may guide that the current connection environment is congested, and provide a solution guide requesting to try again later to the user.

In case it is impossible to access (reach) a cloud service due to the problem in the network environment, the electronic apparatus 100 may provide a solution guide to the user.

In case it is impossible to acquire a cloud service and authority (a DNS failure, a cloud obstacle, use of a wrong log-in identifier (ID)/password (PWD), etc.) before the electronic apparatus 100 registers a new registration apparatus, the electronic apparatus 100 may provide a solution guide to the user.

Meanwhile, an error that may occur between a registration apparatus and the network and a solution thereof may be as follows.

In case the electronic apparatus 100 found out that a cloud (a service provider) cannot normally register a registration apparatus to the cloud due to an obstacle or congestion, the electronic apparatus 100 may provide the cause and a solution guide to the user.

In case an error due to a problem in the connection environment (e.g., the strength of a router wireless signal is weak, a DNS failure, a failure to acquire authority) was found out when a registration apparatus accessed a cloud, the electronic apparatus 100 may provide a solution guide to the user.

Meanwhile, in case an identified error is not stored in a solution database, the processor 130 may determine that the identified error cannot be resolved, and store log information for the error in a log database. Here, the processor 130 may display a UI screen informing that the identified error cannot be resolved on the display (140 in FIG. 3). Depending on embodiments, the processor 130 may transmit the log information to the customer center and request analysis, or request the customer center to send a service engineer.

An operation of acquiring a solution by an electronic apparatus as above will be described in detail below with reference to FIG. 4.

As described above, in case a registration apparatus is not registered to a network, an error is identified by using log information of a plurality of apparatuses and a solution is suggested. As a result, a user can quickly figure out the cause of the error and resolution of the error proceeds swiftly. Accordingly, there is an effect that user convenience is improved.

FIG. 3 is a block diagram illustrating a detailed configuration of the electronic apparatus illustrated in FIG. 2.

Referring to FIG. 3, the electronic apparatus 100 may include a communicator 110, a memory 120, a processor 130, a display 140, and a speaker 150.

Here, some components of the communicator 110, the memory 120, and the processor 130 are the same as those illustrated in FIG. 2, and thus redundant descriptions of such components will be omitted.

The display 140 may display various information according to control of the processor 130. In particular, the display 140 may display response information corresponding to a voice command of a user. Alternatively, the display 140 may display a message informing that response information has been corrected. The display 140 may be implemented as a touch screen together with a touch panel. Depending on embodiments, in the electronic apparatus 100, the display 140 may be omitted.

The speaker 150 is a component that outputs various kinds of audio data for which various processing works such as decoding or amplification, and noise filtering were performed by the processor 130, and also various kinds of notification sounds or voice messages. In particular, the speaker 150 may output information on an identified error. Specifically, the speaker 150 may output the cause of an identified error or an error solution acquired for an error as a voice message in the form of a natural language. Meanwhile, a component for outputting audio may be implemented as a speaker, but this is merely an example, and the component may be implemented as an output terminal that can output audio data.

Depending on embodiments, the electronic apparatus 100 may further include various sensors, a camera, various external input ports for being connected to an external terminal, etc.

Figure 4:
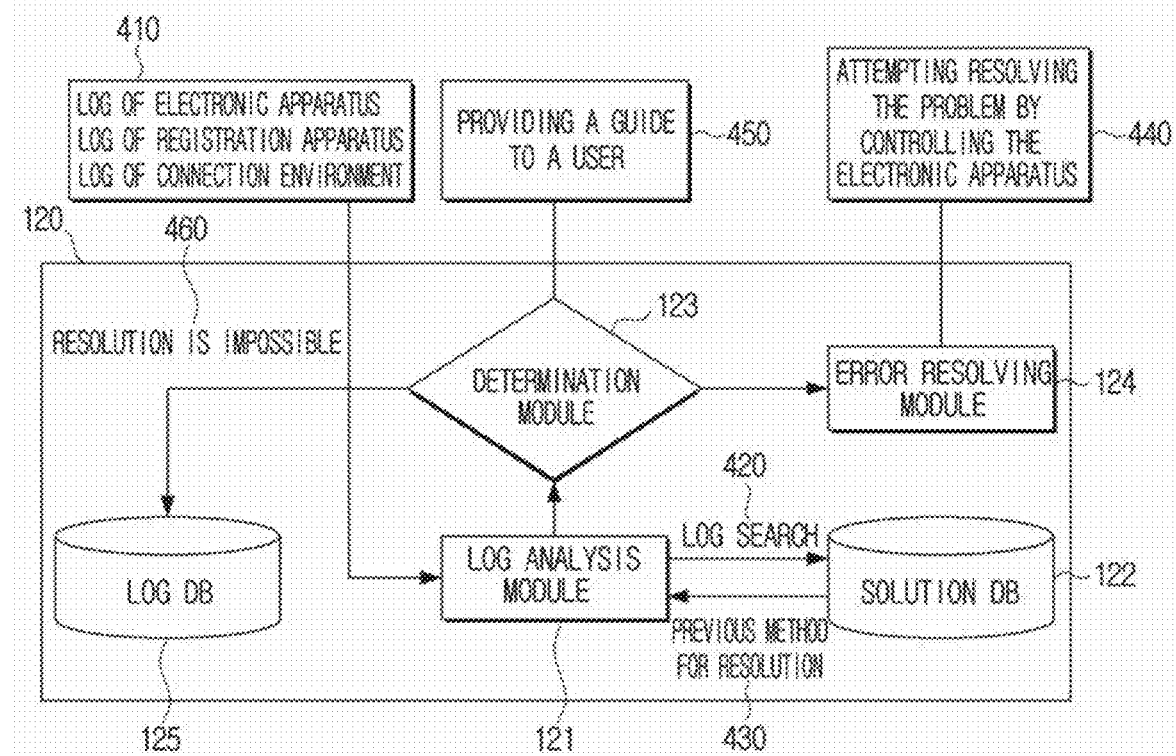
FIG. 4 is a diagram schematically illustrating a method for resolving an error according to an embodiment of the disclosure.

FIG. 4 is a diagram schematically illustrating a method for resolving an error according to an embodiment of the disclosure.

Referring to FIG. 4, the memory 120 may include a plurality of modules necessary for resolving an error. Here, modules are distinguished according to functions and described as a plurality of modules, but several modules may be implemented as one module. Modules may be in the form of software, implemented in the form of at least one hardware chip, or in a combination of hardware and software.

For example, the memory 120 may include a log analysis module 121, a salutation database (DB) 122, a determination module 123, an error resolving module 124, and a log database (DB) 125.

First, the log analysis module 121 may analyze acquired log information 410. Here, the acquired log information 410 may include log information of the electronic apparatus acquired at the electronic apparatus, log information of the registration apparatus received from the registration apparatus, and log information of the connection environment received from the network router. Specifically, the log analysis module 121 may analyze the input log information 410 and identify the corresponding transaction. Also, the log analysis module 121 may correct time information of log information of each apparatus by using the time information of the identified transaction.

Then, the log analysis module 121 may analyze the corrected log information and identify an error. Specifically, the log analysis module 121 may analyze the corrected log information and identify steps of a connection process of apparatuses that were performed normally, and identify a step of registration at which an error occurred.

Further, the log analysis module 121 may acquire information 430 on a solution corresponding to the identified log information from the solution DB 122 by using the identified log information 420 as the cause of the error. Then, the determination module 123 may perform different error resolving operations according to the acquired information 430 on a solution.

For example, if the acquired solution is based on a control command of the electronic apparatus 100 or an external apparatus, the determination module 123 may transmit information on the solution to the error resolving module 124. Here, the error resolving module 124 may try 440 resolving the problem by generating a control command based on the information on the solution, and controlling the electronic apparatus based on the generated control command.

Meanwhile, in the case of an error by an external apparatus, the error resolving module 124 may generate a control command for controlling the external apparatus, and transmit the generated control command to the external apparatus related to the error. For example, in case the registration apparatus was not converted to a soft AP mode and was not registered to the network, the error resolving module 124 may generate a control command for converting the registration apparatus to the soft AP mode, and transmit the generated control command to the registration apparatus.

Meanwhile, in case an error is not an error that can be resolved by a control command, the determination module 123 may provide 450 a guide to the user so that the user takes a corrective measure. For example, in case the strength of a Wi-Fi signal is weak and the registration apparatus is not registered to the network router, the determination module 123 may provide a guide through the display (140 in FIG. 3) so that the user brings the registration apparatus closer to the network router, or removes an adjacent obstacle to improve signal transmission between the apparatuses.

Meanwhile, in case a solution is not stored in the solution DB 122, the determination module 123 may determine that resolution is impossible 460, and store input log information 410 in the log DB 125. In addition, in case an identified error cannot be resolved, the determination module 123 may inform the user, or transmit the log information to the cloud server. Alternatively, the determination module 123 may transmit log information for the error that cannot be resolved to the customer center and request analysis, or request the customer center to request a service engineer.

Figure 5:
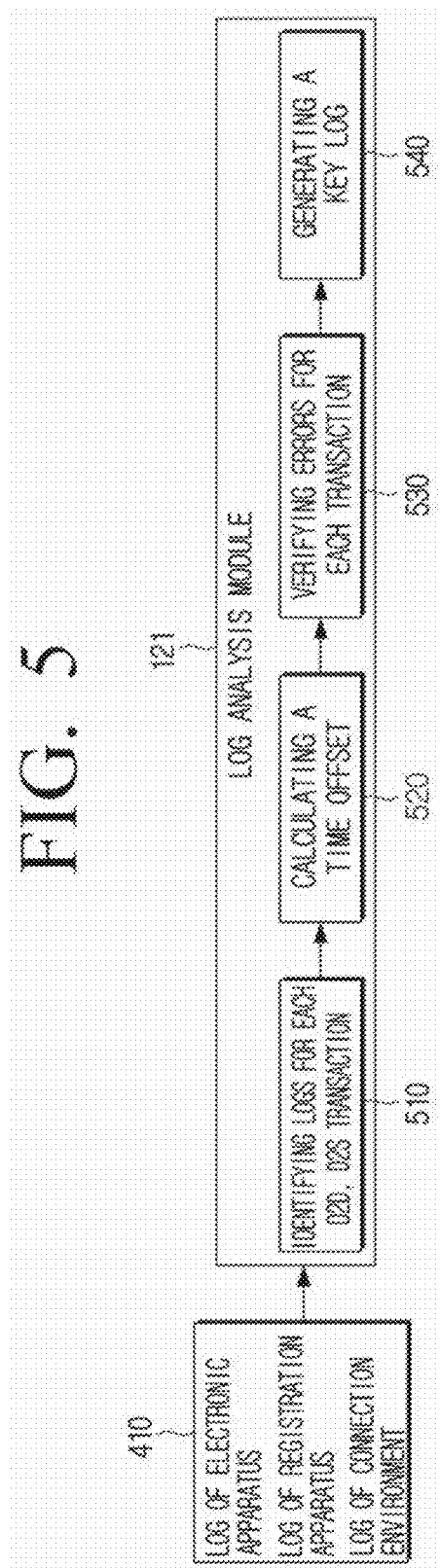
FIG. 5 is a diagram illustrating an operation of analyzing the cause of an error using log information.

FIGS. 5 and 6 are diagrams illustrating an operation of analyzing the cause of an error using log information.

Referring to FIG. 5, the log analysis module 121 of the electronic apparatus may analyze acquired log information 410 and generate key log information 540. Here, the log information 410 may include the log information of the electronic apparatus, the log information of the registration apparatus, and the log information of the connection environment (ENV, the network router), as illustrated in FIG. 6.

First, the log analysis module 121 may identify 510 logs for each D2D and device to service (D2S) transaction. Here, a device to device (D2D) transaction means a transaction between the electronic apparatus and the registration apparatus, and a device to service (D2S) transaction may mean a transaction between the electronic apparatus and the cloud server or a transaction between the registration apparatus and the cloud server.

Specifically, the log analysis module 121 may analyze log information of each apparatus and identify log information corresponding to each other. Specifically, the log analysis module 121 may identify log information for the corresponding transaction in the acquired log information of each apparatus.

For example, as illustrated in FIG. 6, the log analysis module 121 may identify log information including oic/ account information for the corresponding transaction in the log information of the connection environment and the log information of the registration apparatus, and acquire time information of each identified log information.

Also, the log analysis module 121 may identify log information including 'connectToNetwork' in information on transactions in the log information of the electronic apparatus and log information including 'CONNECTED FROM CLIENT' information on a transaction corresponding to 'connectToNetwork' in the log information of the registration apparatus, and acquire time information of each identified log information. Here, information on the corresponding transaction is information stored in advance, and such information on transactions of each apparatus may be matched with the same transaction.

Meanwhile, referring to FIG. 6, a D2S transaction between the network router and the registration apparatus may be determined from the log to be started after a D2D transaction between the electronic apparatus and the registration apparatus started.

Also, the log analysis module 121 may compare time information of identified log information for each transaction and calculate 520 a time correction value (time offset) of log information. Specifically, the log analysis module 121 may acquire a correction value such that time information of the corresponding transactions coincides.

For example, as illustrated in FIG. 6, the log analysis module 121 may correct time information of the log information of the registration apparatus and the network router based on the time information of the log information of the electronic apparatus. Specifically, the log analysis module 121 may adjust the time information of the log information of the electronic apparatus and the log information of the registration apparatus to coincide by using the time information of the log information of the starting point of a D2D transaction between the electronic apparatus and the registration apparatus. Referring to FIG. 6, in the log information of the electronic apparatus, the time information of the log information of the starting point of a D2D transaction is '21:58:18.613,' and the time information of the corresponding log information of the registration apparatus is '21:58:19.269.' The log analysis module 121 may calculate that the log offset of the registration apparatus is '+0.656 s' based on the time information of the log information of the electronic apparatus.

Also, the log analysis module 121 may adjust the time information of the log information of the connection environment and the log information of the registration apparatus to coincide by using the time information of the log information of the starting point of a D2S transaction between the electronic apparatus and the registration apparatus. Referring to FIG. 6, in the log information of the connection environment, the time information of the log information of the starting point of a D2S transaction is '21:58:38.035,' and the time information of the corresponding log information of the registration apparatus is '21:58:33.910.' The log analysis module 121 may identify that the time information of the log information of the connection environment is greater than the time information of the registration apparatus by as much as '4.125 s.' Also, the log analysis module 121 may calculate that the log offset of the connection environment is '4.781 s' based on the time information of the log information of the electronic apparatus by using the fact that the log offset of the registration apparatus is '+0.656 s.'

Then, the log analysis module 121 may correct the time information of the log information of the registration apparatus and the network router based on the calculated log offset. Further, the log analysis module 121 may analyze log information in which time information has been corrected and verify 530 errors for each transaction.

For example, referring to FIG. 6, the log analysis module 121 may determine that the D2D connection is normal based on the log information of the request for a D2D transaction between the electronic apparatus and the registration apparatus and a response thereto. However, if log information for a response corresponding to 'SEND_OBSERVE_NOTIFICATION' transaction requested at the network router is not identified within a predetermined time period from the requested time, the log analysis module 121 may identify that an error occurred in the transaction 'SEND_OBSERVE_NOTIFICATION.'

Then, the log analysis module 121 may generate a key log 540 based on the identified error. Here, the key log is with respect to the log information of the transaction in which the error occurred, and may include information of the transaction in which the error occurred and the cause or reason of occurrence of the error. The key log 540 in the example in FIG. 6 may include 'ENV: SEND_OBSERVE_NOTIFICATION' and 'registration apparatus (ENROLLEE) timeout,' which are information for the transaction that the connection environment requested.

As described above, time information of log information is adjusted to coincide by using the initial transaction between apparatuses, and the cause of an error is identified by analyzing log information. Thus, the cause of an error can be identified more correctly. Accordingly, a correct and swift corrective measure becomes possible.

Figure 7:
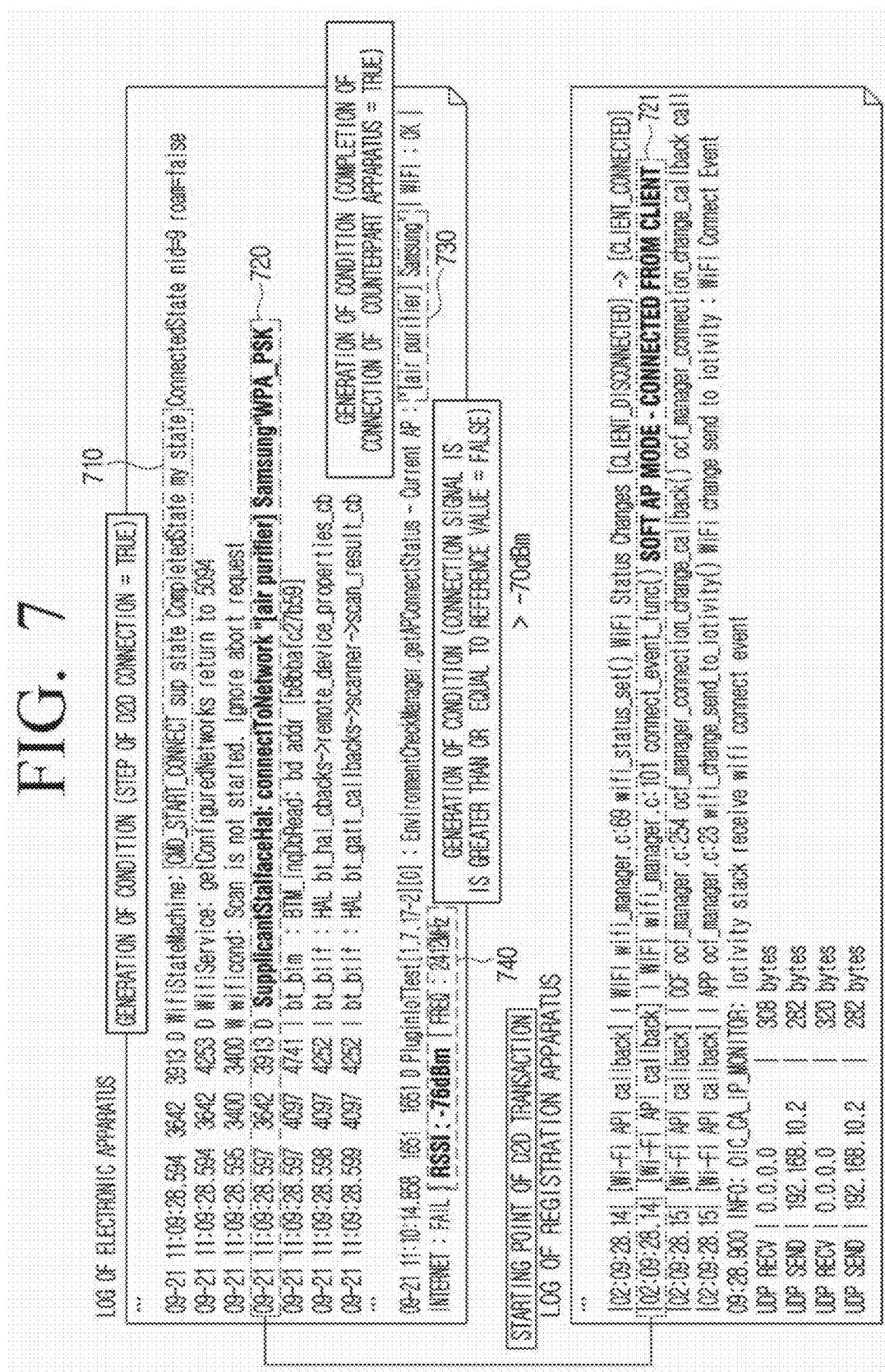
FIG. 7 is a diagram illustrating an operation of an electronic apparatus in case the cause of an error in registration of a registration apparatus is the strength of a connection signal of the registration apparatus.
Figure 8:
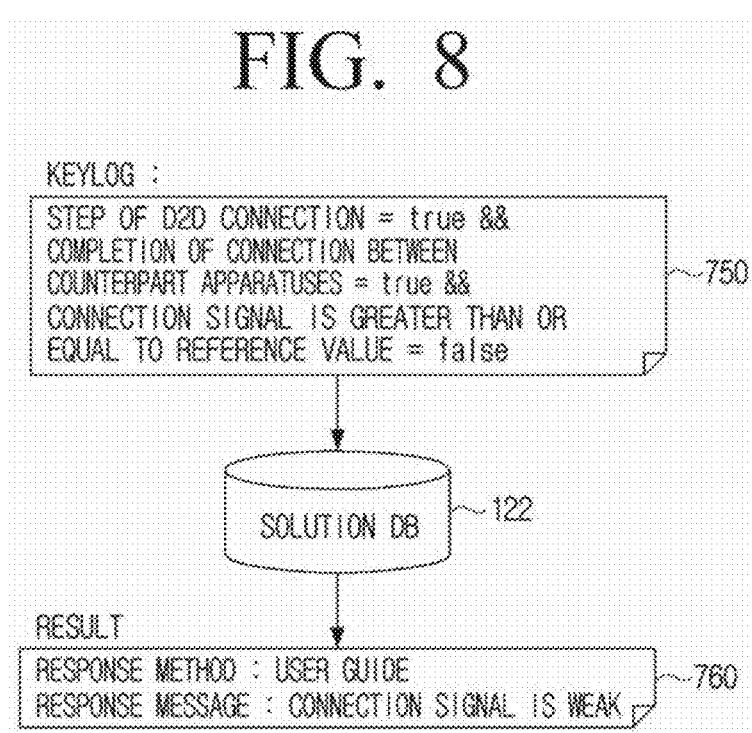
FIG. 8 is a diagram illustrating an operation of an electronic apparatus in case the cause of an error in registration of a registration apparatus is the strength of a connection signal of the registration apparatus.
Figure 9:
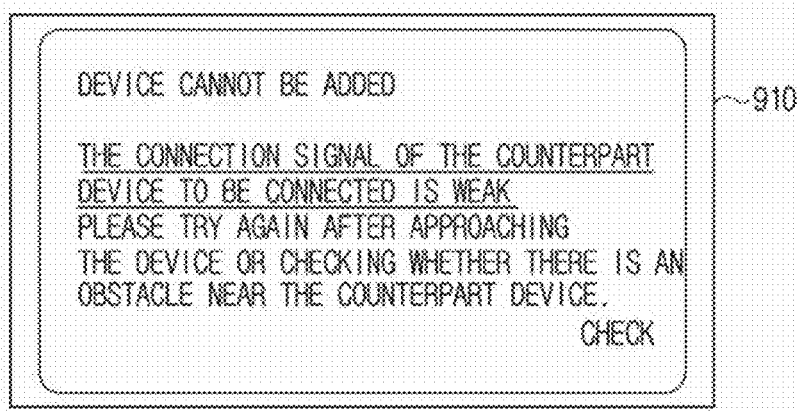
FIG. 9 is a diagram illustrating an operation of an electronic apparatus in case the cause of an error in registration of a registration apparatus is the strength of a connection signal of the registration apparatus.

FIGS. 7 to 9 are diagrams illustrating an operation of an electronic apparatus in case the cause of an error in registration of a registration apparatus is the strength of a connection signal of the registration apparatus. Here, the electronic apparatus may identify steps of a D2D connection process that were performed normally, and identify a step in which an error occurred based on the acquired log information.

Referring to FIG. 7, there is log information including 'CMD_START_CONNECT sup state CompletedState' 710 in information on transactions in the acquired log information of the electronic apparatus. Here, the electronic apparatus may determine that the step of D2D connection started normally (the step of D2D connection=true) based on the state 710.

Also, the electronic apparatus may identify log information for a transaction that the electronic apparatus and the registration apparatus initially exchanged. For example, as illustrated in FIG. 7, the electronic apparatus may identify log information for the request of a transaction including 'ConnectToNetwork "[air purifier] Samsung"' 720 in information on transactions in the log information of the electronic apparatus. Also, the electronic apparatus may identify log information including 'SOFT AP MODE—CONNECTED FROM CLIENT' 721, which is information on a response transaction corresponding to the request in the log information of the registration apparatus.

The electronic apparatus may identify that a D2D transaction between the electronic apparatus and the registration apparatus starts through log information of the transaction that the electronic apparatus and the registration apparatus initially exchanged. For example, as illustrated in FIG. 7, the electronic apparatus may identify log information for the request of a transaction including 'ConnectToNetwork "[air purifier] Samsung"' 720 in information on transactions in the log information of the electronic apparatus. Also, the electronic apparatus may identify log information including 'SOFT AP MODE—CONNECTED FROM CLIENT' 721, which is information on a response transaction corresponding to the request in the log information of the registration apparatus. Here, when the electronic apparatus identified all log information for the transaction request and the transaction response, the electronic apparatus may determine that a D2D transaction between the electronic apparatus and the registration apparatus starts. The electronic apparatus may acquire a time correction value for making the time information of the electronic apparatus and the registration apparatus coincide based on the time information of the log information at which the D2D transaction started. Then, the electronic apparatus may identify the order relation of the log information of the electronic apparatus and the log information of the registration apparatus by reflecting the acquired correction value.

In addition, the electronic apparatus may identify log information for a transaction indicating that D2D connection between the electronic apparatus and the registration apparatus has been completed (completion of connection of the counterpart device=true). For example, as illustrated in FIG. 7, if log information including '"[air purifier] Samsung"|WI-FI:OK' is identified in information on transactions, the electronic apparatus may determine that D2D connection between the electronic apparatus and the registration apparatus has been made normally.

Then, the electronic apparatus may proceed with analysis of log information and identify the cause of the error. For example, referring to FIG. 7, if the electronic apparatus identifies log information 740 in which the strength of a connection signal received from the registration apparatus is −76 dB is smaller than a predetermined value (−70 dB) as a result of analyzing log information, the electronic apparatus may determine that the cause of the error is the strength of a connection signal to the registration apparatus. Here, the electronic apparatus may analyze log information of each apparatus by reflecting a correction value for making the time information coincide.

Based on analysis of log information as described above, the electronic apparatus may generate a key log as illustrated in FIG. 8. Specifically, the electronic apparatus may generate a key log 750 indicating that the step of D2D connection was initiated normally (true), connection between the electronic apparatus and the registration apparatus was completed normally (true), and the strength of a connection signal of the registration apparatus is not (false) greater than or equal to the reference value.

Also, the electronic apparatus may acquire a solution 760 corresponding to the generated key log 750 by using a solution DB 122. Here, the solution DB 122 may be provided on the electronic apparatus, or an external apparatus.

Referring to FIG. 8, the electronic apparatus may acquire a solution 760 that provides a message informing a user that the connection signal is weak 122, and guides the user such that the error is resolved, from the solution DB. Meanwhile, the method of a solution and a message to be displayed may be acquired from the solution DB as illustrated in FIG. 8. Also, as another example, the electronic apparatus that acquired information on a solution from the solution DB may determine whether the error can be resolved by itself by generating a control command, or can be resolved by a user, and the method of the solution and the message to be displayed may be determined based on the result of determination.

Further, as illustrated in FIG. 9, the electronic apparatus may provide the user a message 910 informing that the connection signal of the counterpart device to be connected is weak, and the device should be moved close to the electronic apparatus, or an adjacent obstacle should be removed.

Figure 10:
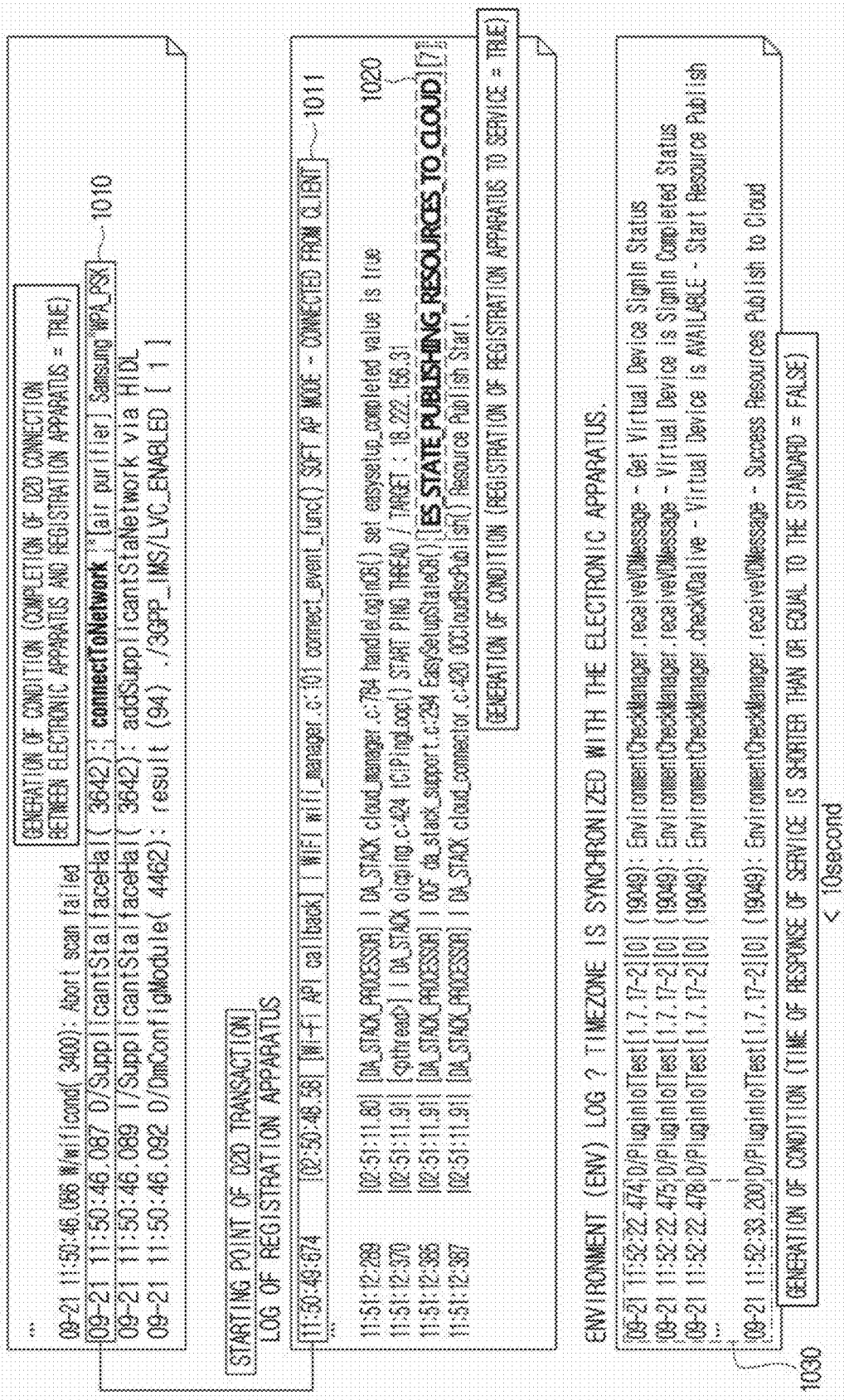
FIG. 10 is a diagram illustrating an operation of an electronic apparatus in case the cause of an error in registration of a registration apparatus is the network environment.
Figure 11:
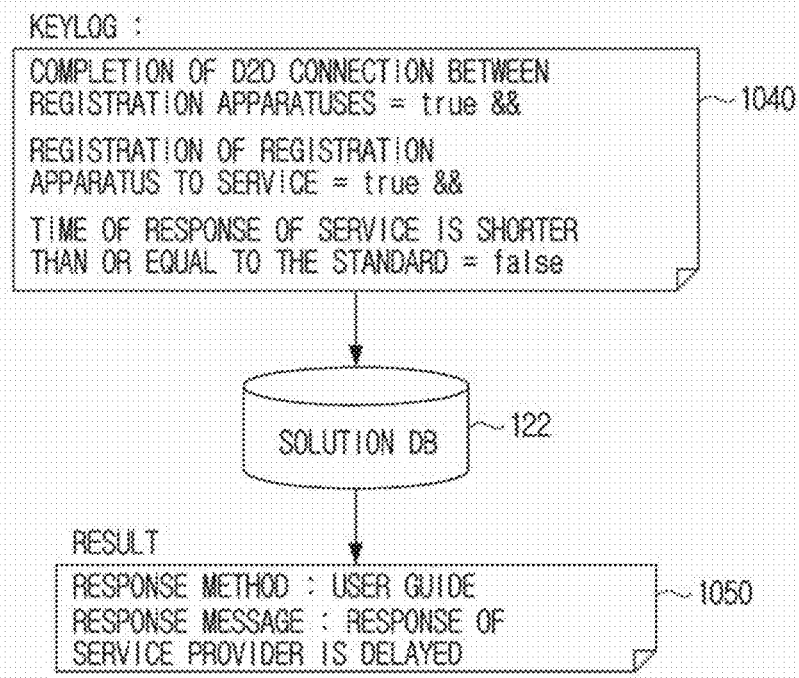
FIG. 11 is a diagram illustrating an operation of an electronic apparatus in case the cause of an error in registration of a registration apparatus is the network environment.
Figure 12:
FIG. 12 is a diagram illustrating an operation of an electronic apparatus in case the cause of an error in registration of a registration apparatus is the network environment.

FIGS. 10 to 12 are diagrams illustrating an operation of an electronic apparatus in case the cause of an error in registration of a registration apparatus is the network environment.

Referring to FIG. 10, the electronic apparatus may analyze the acquired log information and identify log information for a transaction that the electronic apparatus and the registration apparatus initially exchanged. For example, as illustrated in FIG. 10, the electronic apparatus may identify log information for the request of a transaction including 'ConnectToNetwork "[air purifier] Samsung"' 1010 in information on transactions in the log information of the electronic apparatus. Also, the electronic apparatus may identify log information including 'SOFT AP MODE—CONNECTED FROM CLIENT' 1011, which is information on a response transaction corresponding to the request in the log information of the registration apparatus.

The electronic apparatus may adjust the time information to coincide through log information of the transaction that the electronic apparatus and the registration apparatus initially exchanged (the starting point of the D2D transaction). For example, as illustrated in FIG. 10, the electronic apparatus may identify log information for the request of a transaction including 'ConnectToNetwork "[air purifier] Samsung"' 1010 in information on transactions in the log information of the electronic apparatus. Also, the electronic apparatus may identify log information including 'SOFT AP MODE—CONNECTED FROM CLIENT' 1011, which is information on a response transaction corresponding to the request in the log information of the registration apparatus. Here, when the electronic apparatus identified all log information for the transaction request and the transaction response, the electronic apparatus may determine a start of a D2D transaction between the electronic apparatus and the registration apparatus. Similarly, the electronic apparatus may determine that completion of D2D connection between the electronic apparatus and the registration apparatus was performed normally (true).

Further, the electronic apparatus may proceed with analysis of log information and identify the cause of an error. For example, referring to FIG. 10, the electronic apparatus may analyze log information of the registration apparatus, and identify log information including 'ES_STATE_PUBLISHING_RESOURCES_TO_CLOUD' 1020, which is information for the request of a transaction for the registration apparatus to be registered to a service. Here, the electronic apparatus may determine that the request for registration of the registration apparatus to a service was performed normally (true).

Meanwhile, if there is no transaction for a response within a predetermined time period after a transaction 1010 for the request for registration of the registration apparatus was requested in the log information of the environment (ENV) received from the network router apparatus, the electronic apparatus may determine that there is the cause of the error in registration in the network environment. For example, referring to FIG. 10, the electronic apparatus may analyze the log information of the connection environment and if there is no log information (false) for a response corresponding to the request before the predetermined time (ten seconds) regarding the request for a transaction, the electronic apparatus may determine that the delay of a response of the network router is the cause of the error in registration of the registration apparatus. Here, the time information 1030 of the log information of the connection environment may coincide with the time information of other apparatuses as illustrated in FIGS. 5 and 6.

Based on analysis of log information, as described above, the electronic apparatus may generate a key log as illustrated in FIG. 11. Specifically, the electronic apparatus may generate a key log 1040 indicating that the step of D2D connection between the electronic apparatus and the registration apparatus was completed normally (true), the request for registration of the registration apparatus to a service was performed normally (true), and the time for a response of a service is not (false) shorter than or equal to the predetermined time.

Also, the electronic apparatus may acquire a solution 1050 corresponding to the generated key log 1040 by using a solution DB 122. Here, the solution DB 122 may be provided on the electronic apparatus or provided by an external apparatus.

Referring to FIG. 11, the electronic apparatus may acquire a solution 1050 that provides a message informing a user that a response of a service provider is delayed and guides the user such that the error is resolved from the solution DB 122. Meanwhile, the method of a solution and a message to be displayed may be acquired from the solution DB as illustrated in FIG. 11. Also, as another example, the electronic apparatus that acquired information on a solution from the solution DB may determine whether the error can be resolved by itself by generating a control command, or can be resolved by a user, and the method of the solution and the message to be displayed may be determined based on the result of determination.

In addition, as illustrated in FIG. 12, the electronic apparatus may provide a message 1210 informing that connection is being delayed as the network environment is congested, and display a message that the user should try again after a short wait.

Figure 13:
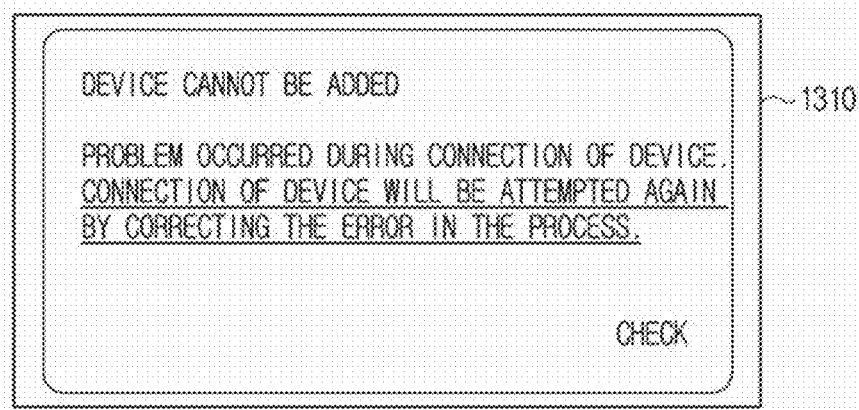
FIG. 13 is a diagram illustrating an embodiment of a UI screen displayed on an electronic apparatus in case resolution of an error by the electronic apparatus is possible.

Meanwhile, based on a solution, in case the electronic apparatus can resolve an error by generating a control command, the electronic apparatus may generate or transmit a control command for resolution of an error. Also, as illustrated in FIG. 13, the electronic apparatus may display a UI screen 1310 informing that an operation of resolving an error was performed to the user.

Figure 14A:
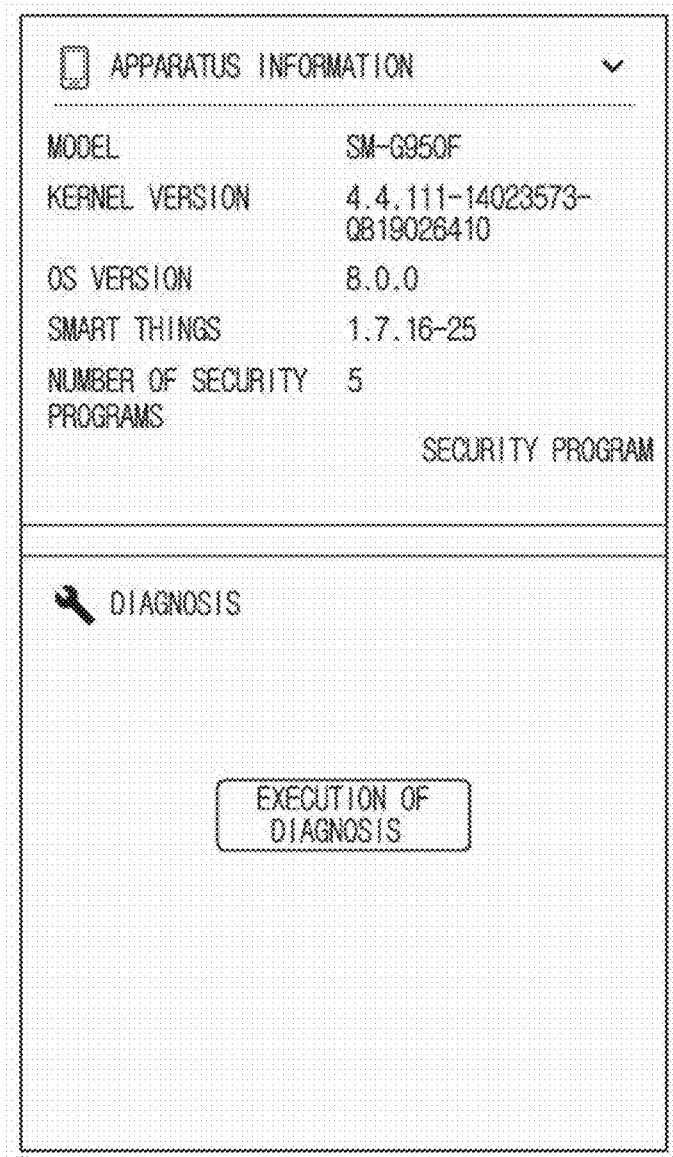
FIG. 14A is a diagram illustrating an embodiment of a UI screen displayed on an electronic apparatus in case the cause of an error in registration of a registration apparatus is the pre-storing of a soft AP.
Figure 14C:
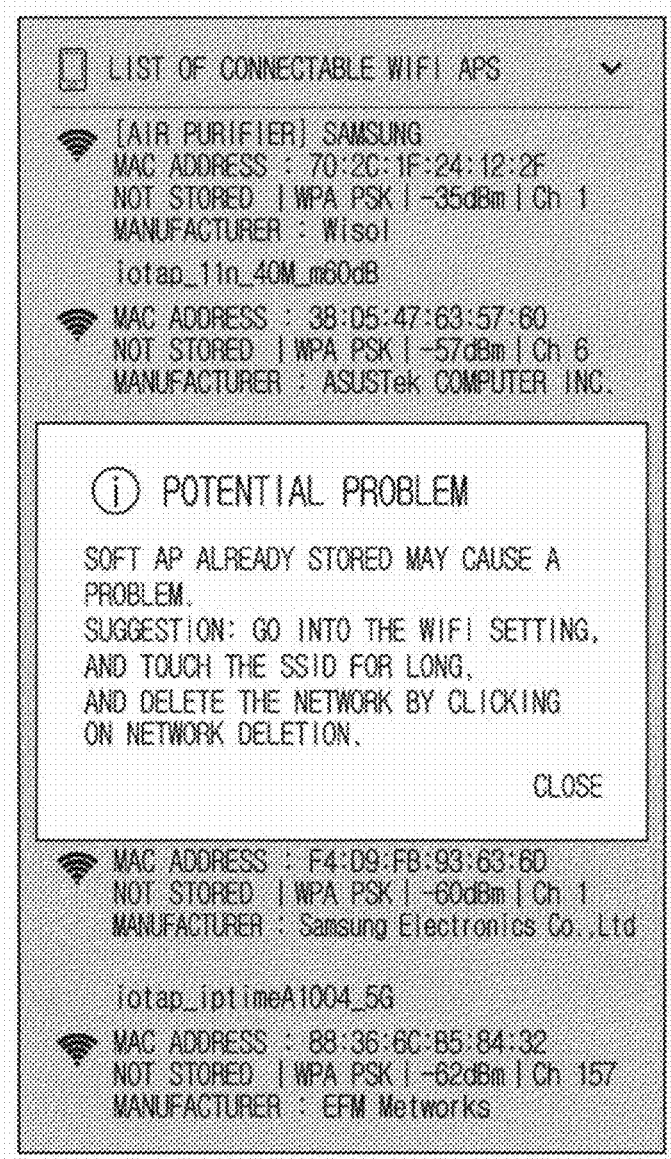
FIG. 14C is a diagram illustrating an embodiment of a UI screen displayed on an electronic apparatus in case the cause of an error in registration of a registration apparatus is the pre-storing of a soft AP.

FIGS. 14A to 14C are diagrams illustrating an embodiment of a UI screen displayed on an electronic apparatus in case the cause of an error in registration of a registration apparatus is the pre-storing of a soft AP.

For example, in case a user wanted to register a washer to a network by using an electronic apparatus, but the washer was not registered to the network, the user may identify the cause of the error in registration by using the electronic apparatus. As an example, the user may identify the cause of the error in registration by pushing a specific button provided on a UI screen for the purpose of diagnosis, as illustrated in FIG. 14A.

Here, the electronic apparatus may acquire the log information of the electronic apparatus, the log information of the washer, and the log information of the network router. The electronic apparatus may analyze the log information, and identify the cause of the error.

Then, the electronic apparatus may display the identified cause of the error as illustrated in FIG. 14B. For example, the electronic apparatus may display a UI screen informing that the soft AP of the registration apparatus was already stored in the electronic apparatus.

Meanwhile, the electronic apparatus may display a UI screen providing the cause of the error, and also display a solution that can resolve the error, as illustrated in FIG. 14C. Here, a screen as in FIG. 14C may be displayed in response to selection of an object for determining additional information was selected on the screen illustrated in FIG. 14B. Meanwhile, a screen as in FIG. 14C may be displayed in case a registration apparatus was selected in an AP list displayed through a route different from FIG. 14B.

As described above, in case a user tried and failed to register a registration apparatus to a network through an electronic apparatus, the electronic apparatus may identify the cause of the error in registration in detail through analysis of log information and provide a result to the user. Thus, the user can identify the exact cause of the error. Also, as the electronic apparatus provides a solution without user interaction, the error may be resolved smoothly, and thus user convenience can be further improved.

Figure 15A:
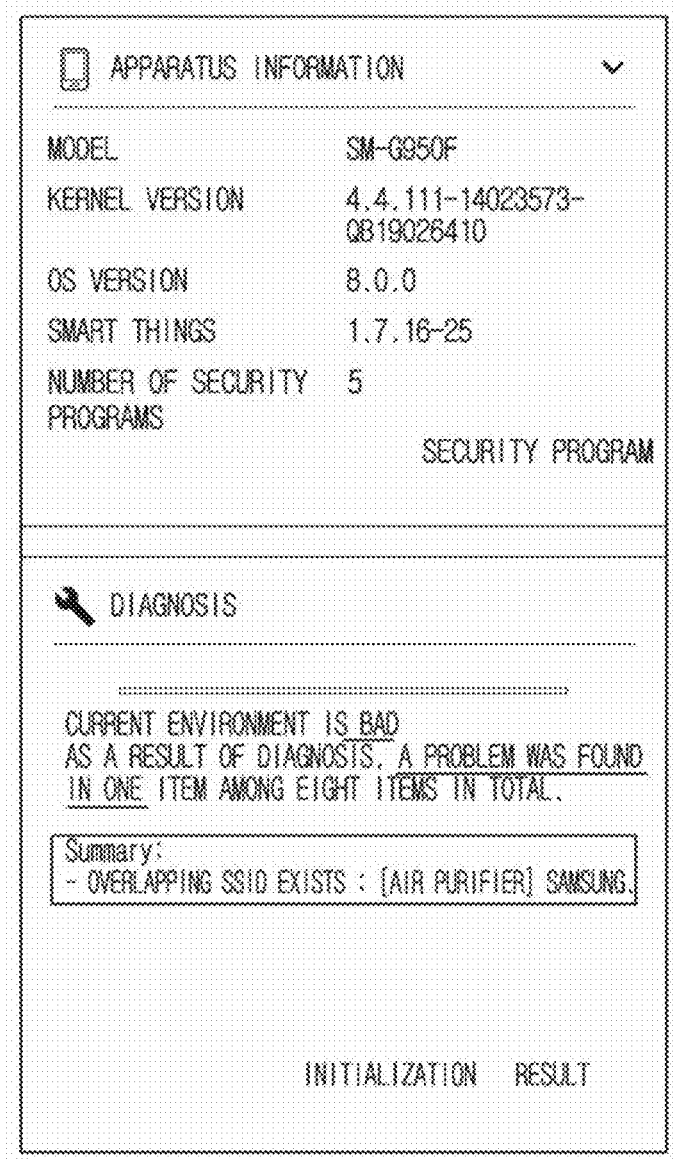
FIG. 15A is a diagram illustrating an embodiment of a UI screen displayed on an electronic apparatus in case the cause of an error in registration of a registration apparatus is detection of an overlapping soft AP in the vicinity.
Figure 15B:
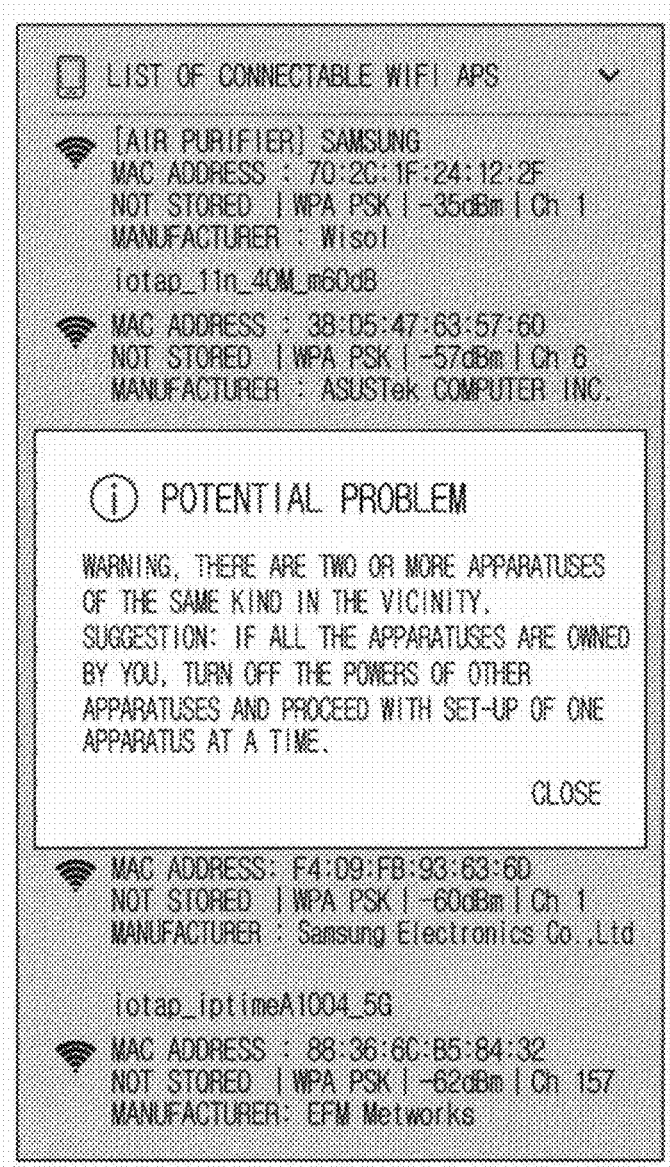
FIG. 15B is a diagram illustrating an embodiment of a UI screen displayed on an electronic apparatus in case the cause of an error in registration of a registration apparatus is detection of an overlapping soft AP in the vicinity.

FIGS. 15A and 15B are diagrams illustrating an embodiment of a UI screen displayed on an electronic apparatus in case the cause of an error in registration of a registration apparatus is detection of an overlapping soft AP in the vicinity.

For example, in case a user wanted to register an air purifier to a network by using an electronic apparatus, but the air purifier was not registered to the network, the user may identify the cause of the error in registration by using the electronic apparatus. As an example, the user may identify the cause of the error in registration by pushing a specific button provided on a UI screen of the electronic apparatus for the purpose of diagnosis.

Here, the electronic apparatus may acquire the log information of the electronic apparatus, the log information of the air purifier, and the log information of the network router; and analyze the log information, and identify the cause of the error.

Then, the electronic apparatus may display the identified cause of the error as illustrated in FIG. 15A. For example, the electronic apparatus may display a UI screen informing the user that an overlapping SSID exists.

Meanwhile, the electronic apparatus may display a UI screen providing the cause of the error, and also a solution that can resolve the error, as illustrated in FIG. 15B. Here, a screen as in FIG. 15B may be displayed in case an object for obtaining additional information was selected on the screen illustrated in FIG. 15A. Meanwhile, a screen as in FIG. 15B may be displayed in case a registration apparatus was selected in an AP list displayed through a route different from FIG. 15A.

As described above, in case a user tried and failed to register a registration apparatus to a network through an electronic apparatus, the electronic apparatus may identify the cause of the error in registration in detail through analysis of log information and provide and solution to the user. Thus, the user can identify the exact cause of the error. Also, as the electronic apparatus provides a solution without user intervention, the error may be resolved smoothly, and thus user convenience can be further improved.

Meanwhile, other than the aforementioned embodiment, the electronic apparatus may identify additional causes of errors, such as a case in which acquisition of a DNS IP necessary for access to a cloud failed and a domain could not be reached, a case in which a designated time for a response regarding cloud connection was exceeded, a case in which connection to Wi-Fi failed, a case in which the state of Internet connection has a problem, etc. through analysis of log information, and provide the causes and solutions for resolving the errors to a user.

FIG. 16 is a flow chart illustrating a method for controlling an electronic apparatus according to an embodiment of the disclosure.

Referring to FIG. 16, first, if registration of a second electronic apparatus to a network through the electronic apparatus fails, the electronic apparatus may acquire the log information of the electronic apparatus, and acquire log information from the second electronic apparatus and the network router apparatus at operation S1610. Here, the electronic apparatus may acquire the log information of the second electronic apparatus from the second electronic apparatus. Also, the electronic apparatus may acquire the log information of the network router apparatus and the log information of a cloud server connected to the network router apparatus from the network router apparatus.

Then, the electronic apparatus may identify corresponding log information in the acquired log information at operation S1620. Here, corresponding log information may be information regarding a request and a response for the same transaction among apparatuses. Specifically, the electronic apparatus may analyze log information of each apparatus and identify log information to identify log entries of corresponding transactions in the differing logs.

Further, the electronic apparatus may acquire a correction value of time information of each apparatus by using the corresponding log information so that time information among the acquired log information coincides at operation S1630.

Specifically, the electronic apparatus may acquire a correction value of time information of each apparatus so that time information of log information for a request for a transaction and time information of log information for a response coincide.

Then, the electronic apparatus may identify an error by using log information reflecting the correction value at operation S1640. Specifically, the electronic apparatus may analyze log information of each apparatus reflecting the correction value. Based on a result of the analysis, the electronic apparatus may identify steps in the process of registering the second electronic apparatus to the network. The electronic apparatus may identify a step in which an error occurred in the registration process through analysis of log information of each apparatus. That is, the electronic apparatus may identify in detail the cause of the registration error.

Then, the electronic apparatus may provide a solution corresponding to the identified error at operation S1650. Specifically, the electronic apparatus may acquire a solution corresponding to the log information of the step in which an error occurred from the solution DB, and output the acquired solution to a user. Here, the solution DB may be provided on the electronic apparatus or provided by an external apparatus.

Meanwhile, based on the acquired solution, in case the error can be resolved by the electronic apparatus itself, the electronic apparatus may resolve the error by generating or transmitting a control command. Here, the electronic apparatus may inform the user that the error is being resolved through a UI screen or notification.

Meanwhile, in case the error cannot be resolved by the electronic apparatus itself, the electronic apparatus may provide the solution to the user, and request the user to perform an operation for resolving the error.

As described above, the electronic apparatus integrates log information of each apparatus and analyzes the information. Accordingly, the cause of failure to register a registration apparatus can be more correctly determined, and a corrective solution can be provided to a user. As a result, user inconvenience can be reduced.

FIG. 17 is a sequence diagram illustrating a method for analyzing an error in registration of a network system according to an embodiment of the disclosure.

Referring to FIG. 17, first, a user 10 may activate the network of the electronic apparatus 100 at operation S1701. For example, the network may be Wi-Fi, Bluetooth, etc. Hereinafter, it will be described that the network is Wi-Fi, for the convenience of explanation, but the network is not limited thereto. Also, the electronic apparatus 100 may identify connection information to the network router apparatus 100 and the cloud server 301.

After the electronic apparatus 100 is connected to Wi-Fi, the user 10 may convert the registration apparatus 200 to "a connection mode" for registering the registration apparatus 200 to the network 300, 301 at operation S1703.

Then, when the user 10 inputs a request to add an apparatus to the network, into the electronic apparatus 100 at operation S1704, the electronic apparatus 100 may disconnect the connection to the network router apparatus (Wifi-AP) 300 at operation S1705, and may be connected to the registration apparatus 200 at operation S1706. Here, the electronic apparatus 100 and the registration apparatus 200 may be connected by a D2D method.

The electronic apparatus 100 may transmit a request for identifying whether a registration apparatus 200 can access the network to the registration apparatus 200 at operation S1707. This is a step for identifying a registration apparatus to be registered to the network 300, 301, and the registration apparatus 200 may provide a UI screen or notification for receiving a request for identification to the user 10 according to receipt of a request for identification. When the user 10 accepts access through the registration apparatus 200 at operation S1708, the electronic apparatus 100 may transmit information on the cloud server 301 and the network to which the registration apparatus 200 will be registered to the registration apparatus 200 at operation S1709.

After completing transmission of information on the cloud server 301 and the network to the registration apparatus 200, the electronic apparatus 100 may disconnect connection to the registration apparatus 200 and may be connected to the network router apparatus 300 again at operation S1710.

The registration apparatus 200 may identify connection information for connection to the network 300, 301 at operation S1711. Also, the registration apparatus 200 may transmit information of the registration apparatus 200 to the cloud server 301 so that the cloud server 301 registers (signs up) the registration apparatus 200 at operation S1712.

Afterwards, the electronic apparatus 100 may re-identify whether the registration apparatus 200 is connected to an appropriate network router apparatus 300 at operation S1713, and the registration apparatus 200 may log in (sign in) to the cloud server 301 at operation S1714. Then, the registration apparatus 200 may register apparatus information to the cloud server 301 at operation S1715. Here, apparatus information may include information on the current state of the surrounding environment such as the power state of the registration apparatus 200, the current temperature, and humidity. The cloud server 301 that registered the current state information of the registration apparatus 200 may notify the electronic apparatus 100 whether registration was completed at operation S1716.

Meanwhile, in case an error occurred in at least one step among S1701 to S1715, the cloud server 301 cannot perform notification of completion of registration. Here, the user 10 may request to re-attempt the registration to the electronic apparatus 100 at operation S1717.

According to the request for re-attempt, the electronic apparatus 100 may request the registration apparatus 200 to convert to "a connection mode" at operation S1718. Afterwards, the electronic apparatus 100 may collect log information of the registration apparatus from the registration apparatus 200, and integrate the information at operation S1719. Also, although not illustrated, the electronic apparatus 100 may integrate the log information of the electronic apparatus 100 with the log information on the connection environment from the network router apparatus 300 and the log information received from the registration apparatus 200.

Then, the electronic apparatus 100 may analyze the acquired log information and analyze a key log at operation S1720. Here, through analysis of log information, the electronic apparatus may identify the steps proceeded normally in the process of registering the registration apparatus 200 to the network 300, 301, and in which step an error occurred, and acquire a key log.

Also, the electronic apparatus 100 may analyze the cause of the problem occurred based on the key log, and re-perform connection at operation S1721. Specifically, the electronic apparatus 100 may acquire a solution according to the identified cause of the error among solutions stored in the solution DB. Then, the electronic apparatus 100 may generate a control command according to the solution and resolve the error by itself, or provide the solution to the user and request the user to resolve the cause of the error.

According to the various embodiments described above, the electronic apparatus integrates log information of each apparatus and analyzes the information, and accordingly, the cause of failure to register a registration apparatus can be determined more correctly. As a result, a corrective solution can be provided to a user, and thus user inconvenience can be reduced.

Meanwhile, the various embodiments described above may be implemented in a recording medium that can be read by a computer or an apparatus similar to a computer, by using software, hardware, or a combination thereof. According to implementation by hardware, the embodiments described in the disclosure may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors or an electronic unit for performing various functions. In some cases, the embodiments described in this specification may be implemented by the processor itself. Meanwhile, according to implementation by software, the embodiments such as procedures and functions described in this specification may be implemented as separate software modules. Each of the software modules may perform one or more functions and operations described in this specification.

Meanwhile, methods according to the aforementioned various embodiments of the disclosure may be stored in a non-transitory readable medium. Such a non-transitory readable medium may be used while being installed on various apparatuses.

A non-transitory readable medium refers to a medium that stores data semi-permanently, and is readable by machines, but not a medium that stores data for a short moment such as a register, a cache, and a memory. Specifically, programs for performing the aforementioned various methods may be provided while being stored in a non-transitory readable medium such as a CD, a DVD, a hard disk, a blue-ray disk, a USB, a memory card, a ROM and the like.

Meanwhile, according to an embodiment of the disclosure, methods according to the aforementioned various embodiments of the disclosure may be provided while being included in a computer program product. A computer program product refers to a product, and it can be traded between a seller and a buyer. A computer program product can be distributed on-line in the form of a storage medium that is readable by machines (e.g.: a compact disc read only memory (CD-ROM)), or through an application store (e.g.: Play Store™). In the case of on-line distribution, at least a portion of a computer program product may be stored in a storage medium such as the server of the manufacturer, the server of the application store, and the memory of the relay server at least temporarily, or may be generated temporarily.

Also, while preferred embodiments of the disclosure have been shown and described, the disclosure is not limited to the aforementioned specific embodiments, and it is apparent that various modifications may be made by those having ordinary skill in the technical field to which the disclosure belongs, without departing from the gist of the disclosure as claimed by the appended claims. Also, it is intended that such modifications are not to be interpreted independently from the technical idea or prospect of the disclosure.

What is claimed is:

1. A method for controlling an electronic apparatus, the method comprising:
    based on a failure of a registration of a controllable electronic apparatus to a network, acquiring first log information of the electronic apparatus, second log information of the controllable electronic apparatus, and third log information of an access point that controls the registration of the controllable electronic apparatus by the electronic apparatus to the network;
    identifying a plurality of log information corresponding to a transaction for registering the controllable electronic apparatus to the network from the first log information, the second log information, and the third log information;
    adjusting at least one of the first log information, the second log information, and the third log information so that time information of the first log information, the second log information, and the third log information coincide, by using the plurality of log information;
    identifying an error occurring during the registration of the controllable electronic apparatus based on the first log information, the second log information, and the third log information; and
    providing a solution for the registration of the controllable electronic apparatus corresponding to the error.

2. The method of claim 1, wherein each of the first log information, the second log information, and the third log information includes information on transactions among the electronic apparatus, the controllable electronic apparatus, and the access point and time information of when the transactions are performed,
    wherein the acquiring comprises acquiring a fourth log information of a cloud server,
    wherein the identifying the plurality of log information comprises identifying the plurality of log information corresponding to the transaction for registering the controllable electronic apparatus to the network from the first log information, the second log information, the third log information, and the fourth log information.

3. The method of claim 2, wherein the electronic apparatus and the controllable electronic apparatus are connected in a device to device (D2D) method.

4. The method of claim 2, wherein the identifying the plurality of log information comprises acquiring a correction value of time information of each apparatus based on time information of transactions initially performed among between the electronic apparatus, the controllable electronic apparatus, the access point, and the cloud server.

5. The method of claim 2, wherein each of the transactions comprises a request from among the electronic apparatus, the controllable electronic apparatus, the access point, and the cloud server, and a response corresponding to the request, and
    wherein the identifying the error comprises based on the response generated within a predetermined time period from a time when the request was generated not existing, identifying the error as related to a transaction.

6. The method of claim 5, wherein the request comprises a registration request for the registration of the controllable electronic apparatus transmitted to the cloud server through the access point, and
    wherein the identifying the error comprises based on the response corresponding to the registration request within the predetermined time period not existing among the third log information, identifying the error as related to a network environment of the network.

7. The method of claim 1, wherein the identifying the error comprises identifying the error as related to at least one of the controllable electronic apparatus, the access point, or a cloud server connected to the access point based on the plurality of log information reflecting the time information, and
    wherein the providing comprises acquiring information on the solution corresponding to the error from a solution database, and displaying the solution.

8. The method of claim 1, wherein the identifying the error comprises identifying the error as related to at least one of the controllable electronic apparatus, the access point, or a cloud server connected to the access point based on the plurality of log information reflecting the time information, and
    wherein the providing comprises acquiring information on the solution corresponding to the error from a solution database, and based on the error being related to the controllable electronic apparatus, transmitting a control command for converting the controllable electronic apparatus into a soft access point (AP) mode to the controllable electronic apparatus.

9. The method for controlling an electronic apparatus of claim 1, wherein the identifying the error comprises:
    identifying the error as related to at least one of the controllable electronic apparatus or the access point based on the plurality of log information reflecting the time information, and
    based on information on the solution corresponding to the error not existing in a solution database, storing additional log information related to the error in a log database.

10. An electronic apparatus comprising:
    a communicator;
    a memory storing at least one instruction; and
    a processor which when executing the at least one instruction is configured to:

based on a failure of a registration of a controllable electronic apparatus to a network, acquire first log information of the electronic apparatus, second log information of the controllable electronic apparatus, and third log information of an access point that controls the registration of the controllable electronic apparatus by the electronic apparatus to the network, identify a plurality of log information corresponding to a transaction for registering the controllable electronic apparatus to the network from the first log information, the second log information, and the third log information, adjust at least one of the first log information, the second log information, and the third log information so that time information of the first log information, the second log information, and the third log information coincide, by using the plurality of log information, identify an error occurring during the registration of the controllable electronic apparatus based on the first log information, the second log information, and the third log information, and provide a solution for the registration of the controllable electronic apparatus corresponding to the error.

11. The electronic apparatus of claim 10, wherein each of the first log information, the second log information, and the third log information includes information on transactions among the electronic apparatus, the controllable electronic apparatus, and the access point and time information of when the transactions are performed, and wherein the processor when executing the at least one instruction is further configured to acquire a fourth log information of a cloud server and identify the plurality of log information corresponding to the transaction for registering the controllable electronic apparatus to the network from the first log information, the second log information, the third log information, and the fourth log information.

12. The electronic apparatus of claim 11, wherein the electronic apparatus and the controllable electronic apparatus are connected in a device to device (D2D) method.

13. The electronic apparatus of claim 11, wherein the processor when executing the at least one instruction is further configured to acquire a correction value of time information of each apparatus based on time information of the transactions initially performed among the electronic apparatus, the controllable electronic apparatus, the access point, and the cloud server.

14. The electronic apparatus of claim 11, wherein each of the transactions comprises a request from among the electronic apparatus, the controllable electronic apparatus, the access point, and the cloud server, and a response corresponding to the request, and wherein the processor when executing the at least one instruction is further configured to, based on the response generated within a predetermined time period from a time when the request was generated not existing, identify the error related to a transaction.

15. The electronic apparatus of claim 14, wherein the request comprises a registration request for the registration of the controllable electronic apparatus transmitted to the cloud server through the access point, and wherein the processor when executing the at least one instruction is further configured to, based on the response corresponding to the registration request within the predetermined time period not existing among the third log information, identify the error as related to a network environment of the network.

16. The electronic apparatus of claim 10, wherein the processor when executing the at least one instruction is further configured to:

identify the error as related to at least one of the controllable electronic apparatus or the access point based on the plurality of log information reflecting the time information, acquire information on the solution corresponding to the error from a solution database, and display the solution.

17. The electronic apparatus of claim 10, wherein the processor when executing the at least one instruction is further configured to:

identify the error as related to at least one of the controllable electronic apparatus, the access point, or a cloud server connected to the access point based on the plurality of log information reflecting the time information, acquire information on the solution corresponding to the error from a solution database, and based on the error being related to the controllable electronic apparatus, transmit a control command for converting the controllable electronic apparatus into a soft access point (AP) mode to the controllable electronic apparatus.

18. The electronic apparatus of claim 10, wherein the processor when executing the at least one instruction is further configured to:

identify the error as related to at least one of the controllable electronic apparatus or the access point based on the plurality of log information reflecting the time information, and based on information on the solution corresponding to the error not existing in a solution database, store additional log information related to the error in a log database.

19. A non-transitory computer-readable recording medium including a program for executing a method for controlling an electronic apparatus, wherein the method for controlling the electronic apparatus comprises:

based on a failure of a registration of a controllable electronic apparatus to a network, acquiring first log information of the electronic apparatus, second log information of the controllable electronic apparatus, and third log information of an access point that controls the registration of the controllable electronic apparatus by the electronic apparatus to the network;

identifying a plurality of log information corresponding to a transaction for registering the controllable electronic apparatus to the network from the first log information, the second log information, and the third log information;

adjusting at least one of the first log information, the second log information, and the third log information so that time information of the first log information, the second log information, and the third log information coincide, by using the plurality of log information;

identifying an error occurring during the registration of the controllable electronic apparatus based on the first log information, the second log information, and the third log information; and providing a solution for the registration of the controllable electronic apparatus corresponding to the error.

* * * * *